United States Patent [19]

Kishi et al.

[11] Patent Number: 5,613,138
[45] Date of Patent: Mar. 18, 1997

[54] DATA TRANSFER DEVICE AND MULTIPROCESSOR SYSTEM

[75] Inventors: Tetsuji Kishi; Ichiro Okabayashi; Yasuhiro Mori; Manabu Migita, all of Osaka; Yuri Kuwata, Hyogo, all of Japan

[73] Assignee: Matsushita Electric Industrial Co., Ltd., Osaka, Japan

[21] Appl. No.: 213,959

[22] Filed: Mar. 16, 1994

[30] Foreign Application Priority Data

Mar. 17, 1993 [JP] Japan ................................. 5-056609

[51] Int. Cl.$^6$ ........................................................ G06F 15/00
[52] U.S. Cl. ................... 395/800; 395/200.01; 395/280
[58] Field of Search ........................... 395/800, 200.01; 364/DIG. 1, DIG. 2

[56] References Cited

U.S. PATENT DOCUMENTS

| | | | |
|---|---|---|---|
| 3,979,728 | 9/1976 | Reddaway | 340/172.5 |
| 4,128,880 | 12/1978 | Cray, Jr. | 395/800 |
| 4,387,365 | 6/1983 | Berry et al. | 340/347 |
| 4,744,023 | 5/1988 | Welsch | 395/200.13 |
| 5,081,573 | 1/1992 | Hall et al. | 395/800 |
| 5,113,523 | 5/1992 | Colley et al. | 395/800 |
| 5,134,695 | 7/1992 | Ikeda | 395/405 |
| 5,134,699 | 7/1992 | Aria et al. | 395/855 |

FOREIGN PATENT DOCUMENTS 61-139868  6/1986  Japan.
3-105543  5/1991  Japan.

OTHER PUBLICATIONS

"Parallel Processing Performance in a Linda System", Lothar Borrmann et al., 1989 International Conference on Parallel Processing, pp. I–151 through I–153.
"VLSI Parallel Computer with Data Transfer Network: ADENA", H. Kadota et al., 1989 International Conference on Parallel Processing, pp. I–139 through I–322.
"Network Structure and VLSI Implementation For A Parallel Computer: ADENA", I. Okabayashi et al., Matsushita Electric Industrial Co., pp. 1–8.

Primary Examiner—Alyssa H. Bowler
Assistant Examiner—John Follansbee
Attorney, Agent, or Firm—McDermott, Will & Emery

[57] ABSTRACT

In a system for executing distribution, arrangement and collection of array data between a host processor and plural processor elements, control parameter regarding array data to be transferred and an identification number assigned to each data receiver are set beforehand to a data receiver of each processor element. Data sequentially sent out onto a data bus with synchronization with a strobe signal from the data transmitter of the host processor are fetched selectively according to a data transfer allowance signal generated based on the control parameter and the identification number. The fetched data is written into a memory with a discrete address.

3 Claims, 16 Drawing Sheets

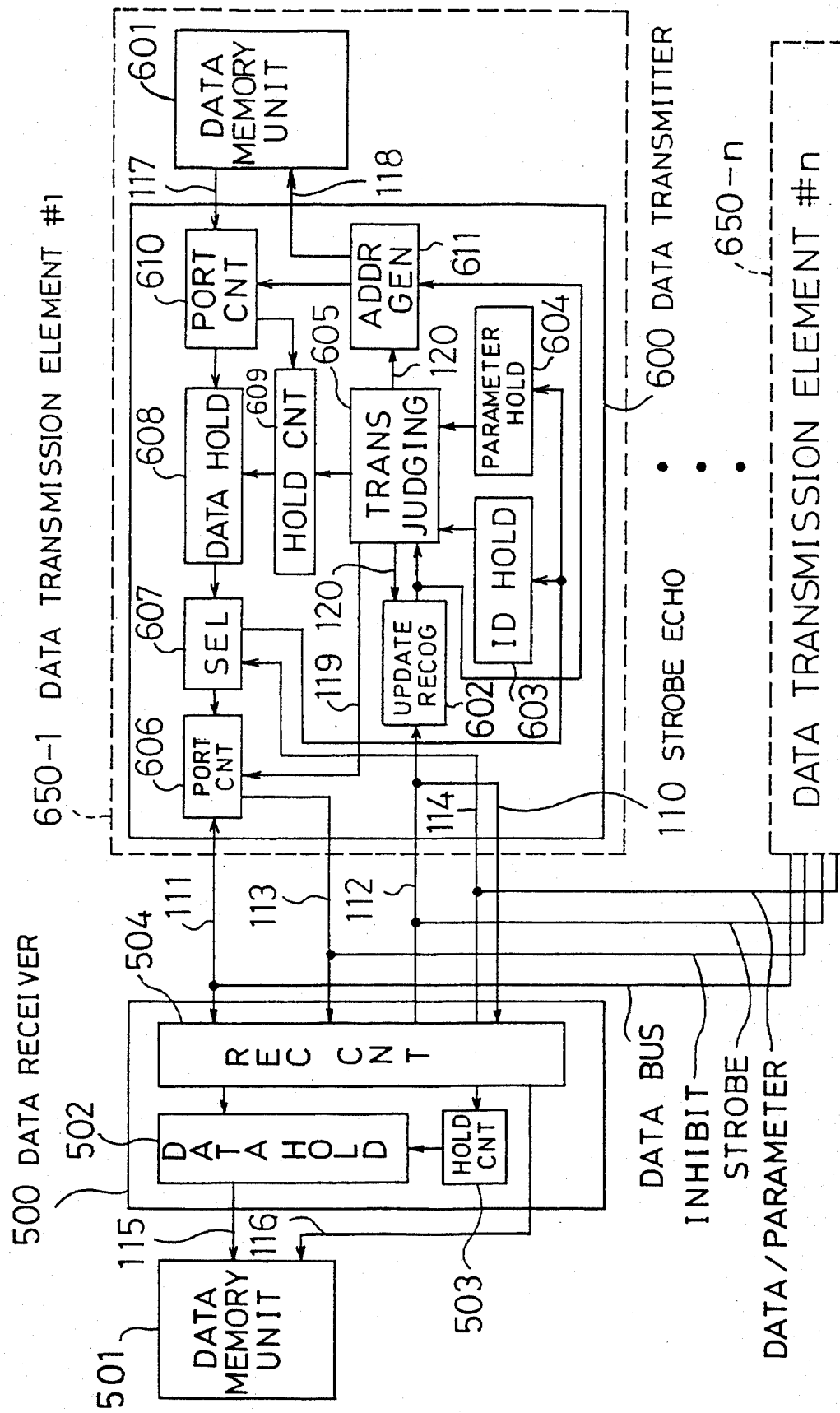

| PE(1,2) a(X,1,4) | PE(2,2) a(X,2,4) |
| PE(1,1) a(X,1,3) | PE(2,1) a(X,2,3) |

763

| PE(1,2) a(X,3,4) | PE(2,2) a(X,4,4) |
| PE(1,1) a(X,3,3) | PE(2,1) a(X,4,3) |

760

| PE(1,2) a(X,1,2) | PE(2,2) a(X,2,2) |
| PE(1,1) a(X,1,1) | PE(2,1) a(X,2,1) |

762

| PE(1,2) a(X,3,2) | PE(2,2) a(X,4,2) |
| PE(1,1) a(X,3,1) | PE(2,1) a(X,4,1) |

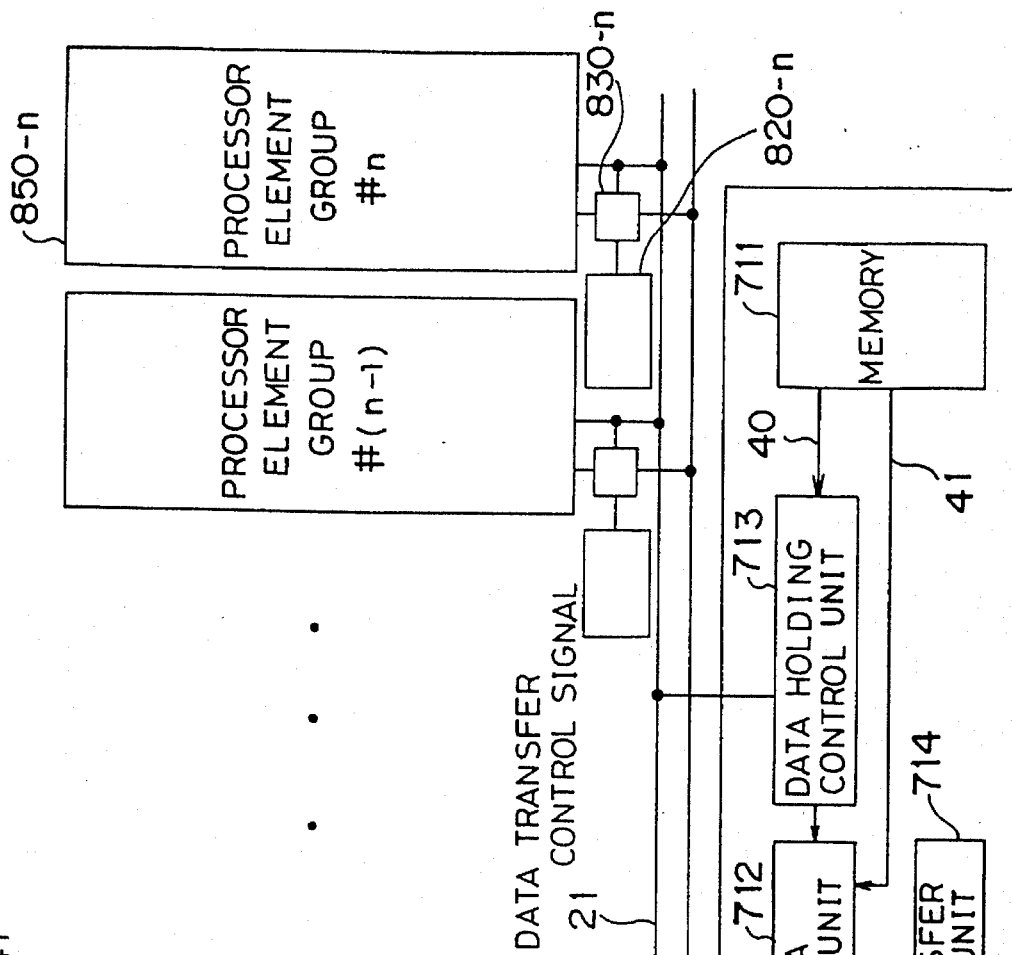
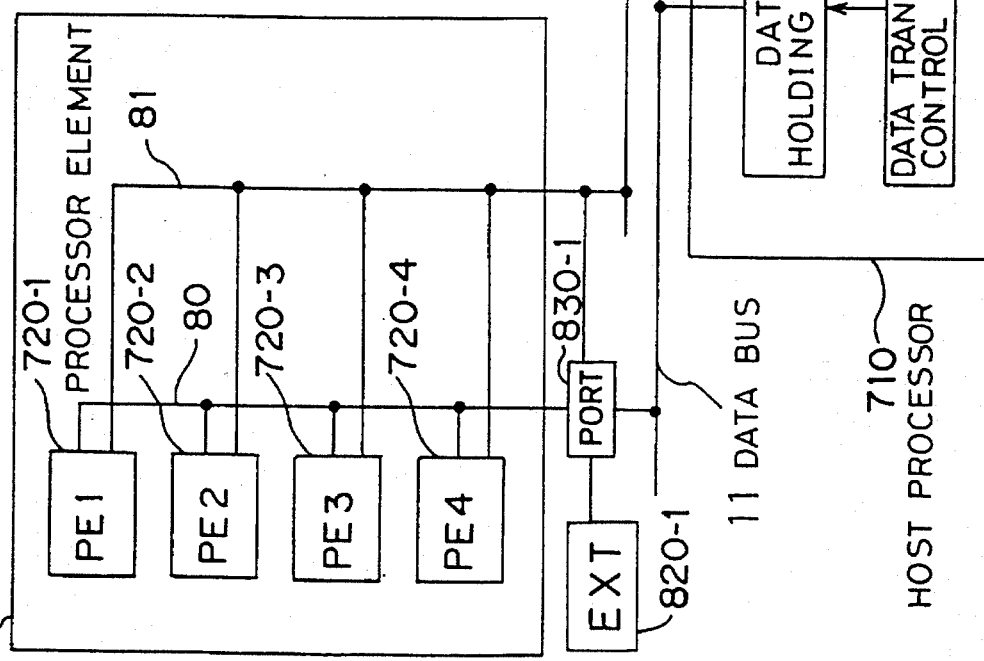
FIG.12

DATA TRANSFER DEVICE AND MULTIPROCESSOR SYSTEM

BACKGROUND OF THE INVENTION

This invention relates to a device for data transfer in a data processor, and particularly relates to a multiprocessor system using a plurality of data transfer devices.

Recently, a multiprocessor system composed of a plurality of processors is focussed on in order to enhance processability of a computer. The multiprocessor system is a computer in which a plurality of processor elements each having a processor and a data transfer device are connected one another by an interconnection network. Various multiprocessor systems have been disclosed such as in H. Kadota et al., "VLSI Parallel Computer with Data Transfer Network: ADENA," Proc. of 1989 International Conference on Parallel Processing, August 1989, pp. I-319–22.

In the multiprocessor system, high-speed processing is contemplated in such a manner that sequential data managed by one processor are distributed and arranged to the plural processor elements to execute calculation processing in parallel form. A host processor executes management of an initial data regarding sequential processing and calculation and management of input/output data. In case where the system executes calculation of a parallel event, the host processor preforms data distribution and arrangement to the plural processor elements. When the host processor executes sequential calculation, using data of parallel calculation result, the plural processor elements are required to perform data collection.

For example, this corresponds to a case where calculation of array data is executed in the order of calculation formulae (1), (2) and (3) as follows:

$$b(i, j, k)=a(i, j, k)+2.5 \qquad (1)$$

$$sum=sum+b(i, j, k)*c(i, j, k) \qquad (2)$$

$$d(i, j, k)=d(i, j, k)*sum \qquad (3)$$

Wherein, in each calculation formula, $1 \leq i \leq imax$, $1 \leq j \leq jmax$, and $1 \leq k \leq kmax$.

Normally, array data a, b, c, d which are to be used in the calculation of the calculation formulae (1)–(3) are managed in a memory of the host processor. Each calculation formula (1), (3) can be executed in parallel. At execution of the calculation formula (1), the host processor distributes and arranges the data to the plural processor elements to make each processor element execute parallel calculation regarding the calculation formula (1). Since the calculation formula (2) is for executing sequential calculation, using the result of the parallel calculation, data collection to the host processor or one of the processor elements is required. Therefore, the data in the processor elements are collected to one of the processors which executes the sequential calculation. The calculation formula (3), which can be performed in parallel, is executed, distributing and arranging the data to each processor element, as well as in the case of the calculation formula (1).

According to one example of methods for assigning array data regarding calculation (by I. Okabayashi et al.; Network structure and VLSI implementation for a parallel computer: ADENA, Technical Report of IEICE, ICD89-152, 1989), the array data are assigned to each processor element to which two eigen-recognition numbers are allotted, corresponding to subscripts in two directions out of subscripts in three directions of three-dimensional array data.

Referring to FIGS. 13–15, operation of distribution, arrangement and collection of data in a conventional multiprocessor system.

FIG. 13 shows a construction of a conventional multiprocessor system. In the figure, reference numeral 900 indicates a host processor. 910 is a processor element. 920-1–920-4 are processor element groups respectively composed of the processor elements in a set number. 930-1–930-4 are sub-processors respectively for selecting one of the processor element groups 920-1–920-4 according to a direction from the host processor 900. 940 is an exchange control circuit for connecting an internal switch of one of the sub-processors 930-1–930-4 to one of the processor element groups 920-1–920-4 according to the direction from the host processor 900. 50 is a broadcast bus. 51-1–51-4 are sub-broadcast buses of the respective processor element groups 920-1–920-4.

Such a construction is disclosed as prior art in, for example, Laid Open unexamined Japanese Patent Application No. 61-139868 and "Parallel Processing Performance in a Linda System," by L. Borrmann, M. Herdieckerhoff, Proc. of 1989 International Conference on Parallel Processing, August 1989, pp. I-151–53.

According to the construction shown in FIG. 13, the respective processor elements 910 in the processor element groups 920-1–920-4 are connected to the respective sub-processors 930-1–930-4 via the respective sub-broadcast busses 51-1–51-4. The sub-processors 930-1–930-4 are connected to the host processor 900 via the broadcast bus 50. When data is transferred between the host processor 900 and a specific processor element 910, the host processor 900 directs the exchange control circuit 940 to connect the broadcast bus 50 to the sub-broadcast buses 51-1–51-4 by directing a specified one of the sub-processors 930-1–930-4. Further, the sub-processors 930-1–930-4 specifies a specific processor element 910 to perform data transfer.

FIG. 14 shows a format of data packet used in case where data are distributed, arranged and collected by packet transfer. In the figure, reference numeral 60 indicates a synchronization flag and 61 is a target address. The target address 61 is composed of a target processor element group address 62 and a target processor element address 63. 64 indicates data.

FIG. 15 shows a construction of a conventional multiprocessor system for data transfer using the data packet in FIG. 14. In FIG. 15, reference numeral 900 indicates the host processor. 951 is a memory of the host processor 900. 952 is a data transfer device of the host processor 900. 70 is an internal bus. 953 is data transmission control means for controlling data transmission. 954 is packet generation/addition means for generating packet at data transmission of the data transfer device 952. 955 is data receiving control means for controlling data receiving. 956 is packet recognition means for executing decomposition of received packet and command recognition. 957 is data classification means for classifying data by sequentially fetching a target address in the packet.

920-1–920-4 are processor element groups each composed of a plurality of processor elements 910. In each processor element 910, 961 is a memory, 962 is a data transfer device and 71 is an internal bus. 963 is data transmission control means for controlling data transmission of the processor element 910. 964 is packet generation/addition means for generating packet regarding data transmission. 965 is data receiving control means for controlling data receiving. 966 is packet recognition means for executing decomposition of received packet and command recognition.

Reference numeral 50 indicates a broadcast bus. 51-1 is a sub-broadcast bus in the processor element group 920-1. 930-1–930-4 are sub-processors respectively intervened between the host processor 900 and the processor element groups 920-1–920-4. 940 is the same exchange control circuit as in FIG. 13.

In FIG. 15, when the host processor 900 executes data distribution and arrangement to the processor elements 910 of the plural processor element groups 920-1–920-4, each processor element holds beforehand an eigen-recognition number PID of the processor element and an eigen-recognition number GID of the processor element group. The packet generation/addition means 954 in the data transfer device 952 of the host processor 900 generates, as shown in FIG. 14, a corresponding recognition number (target processor element group address 62 and target processor element address 63) as the target address 61 of packet and adds the generated one to the data 64 to execute data transmission by the data transmission control means 953.

In each processor element 910, the data receiving control means 965 receives data packet transmitted at once by the host processor 900, and the packet recognition means 966 judges whether the received data packet is provided to the own data receiving control means 965. When the judgement results in TRUE, the data is read by the data receiving control means 965 from the broadcast bus 50 through the sub-broadcast bus 51-1, and is written into the memory 961. When the judgement results in FALSE, data is not accepted.

Reversely, when the processor elements 910 transmit data to the host processor 900, it is impossible that the plural processor elements 910 generate data packet at a same time and transmit the data packet, because of data race caused. Therefore, the data receiving control means 955 of the host processor 900 specifies one of the sub-processors 930-1–930-4 (e.g. 930-1) via the exchange control circuit 940 to execute bus connection to the processor group 920-1 between the broadcast bus 50 and the sub-broadcast bus 51-1. In the processor element 910 under the bus connection, the packet generation/addition means 964 generates data packet and the data transmission control means 963 executes data transmission. In this case, a sequence of data storage is provided to the packet generated in the packet generation/addition means 964.

Such a method is disclosed in the above Japanese reference 61-139868 as another prior art technique, in which efficient data distribution, arrangement and collection are contemplated in a multiprocessor system by using data packet.

In general, as described above, there are chief two methods for executing data distribution, arrangement and collection in the conventional multiprocessor system: (1) a method that the broadcast buses are respectively provided; and (2) a packet control method.

Under the above construction, however, as cleared from FIG. 13, a control port and a switching mechanism are required for each processor, which involves complicated system. Further, one host processor 900 concentrates on management of the bus switching, with results that signal lines for switch control are increased in number and in length in proportion to increase in processors. This causes concentration of task regarding control at the processor for controlling the signal control lines. Otherwise, if a multi-port is provided to each processor, the ports are increased in number, which involves complication of port control and construction of the processors.

Moreover, in the packet method in FIG. 15, lengthy packet data must be transferred at every data transfer. In other words, extra data must be sent out to the broadcast bus 50. Especially, with data of short data length, overhead of packet data, i.e. overhead such as packet receiving, address matching, packet discard and the like is unnecessarily increased, with a result of lowered data transfer efficiency. This circumstance is not improved even in case where the processor element group with no relation to the data transfer is electrically disconnected, and all processors are required to execute control recognition by packet again after reconnection.

In data distribution and arrangement where the host processor 900 transmits data to the processor elements 910, judgement can be performed with only data packet. However, since data concentration occurs where the data in the processor elements 910 are collected to the host processor 900, the host processor 900 is required to specify the processor element 910 in a prescribed method and to execute data classification operation according to the received data packet. There may be a method that data is written into the memory 951 without using data classification means 957 for data classification operation. Anyway, hardware regarding the selection of the processor element groups 920-1–920-4 is required. Further, hardware for respective data transfer devices 952, 962 of the host processor 900 and the processor elements 910 must be increased and hardware for path selection in the broadcast bus 50 is also required, with a result of complicated hardware.

SUMMARY OF THE INVENTION

The present invention has its object of realizing a novel mechanism for performing efficient data distribution, arrangement and collection without special switch control and packet control.

To attain the above object, in the present invention, a construction is employed which performs data transfer, individually generating, in each processor element, a recognition number address corresponding to a target address in packet.

According to the present invention, operation in case, for example, where array data are distributed from one data transmitter to plural data receivers, is such that: control parameter regarding a transfer range of the array data is set beforehand in control parameter holding unit of each data receiver (the setting is executed by only one-time transfer of the parameter through a data bus from the data transmitter or by self-setting of the parameter by each data receiver); after the setting of the control parameter, the data transmitter sends out a strobe signal and data synchronizing therewith; and each data receiver operates transfer allowance judging unit at ever receiving of the strobe signal, and judges whether data can be received independently from the data transmitter. Thereby, efficient data distribution and arrangement are realized without using complicated packet control. Further, no switching mechanism regarding the selection of data transfer target is required.

BRIEF DESCRIPTION OF THE DRAWINGS

FIG. 5 is a block diagram showing a construction of a data transfer device according to a second embodiment of the present invention.

FIG. 10 is a explanatory drawing of data multiple assignment to four processor elements.

FIG. 12 is a block diagram showing a construction of a multiprocessor system according to a fifth embodiment of the present invention.

DETAILED DESCRIPTION OF THE INVENTION

Five embodiments according to the present invention are described below, with reference to accompanying drawings.

(FIRST EMBODIMENT)

Figure 1:
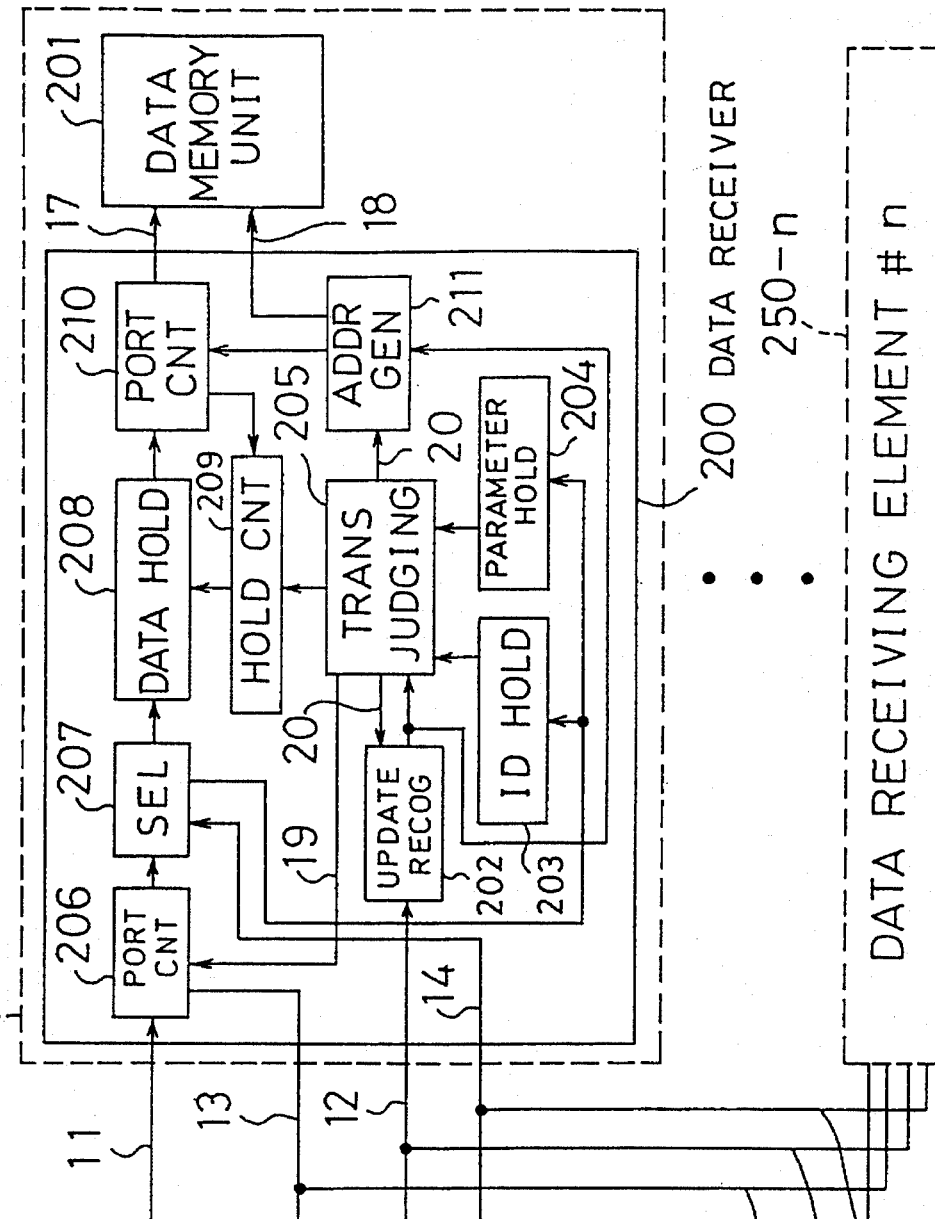
FIG. 1 is a block diagram showing a construction of a data transfer device according to a first embodiment of the present invention.

FIG. 1 is a block diagram showing a construction of a data transfer device according to the first embodiment of the present invention. In the figure, reference numeral 100 indicates a data transmitter. 200 is a data receiver provided in each data receiving element 250-1–250-n. The data transmitter 100 transmits data to the plural data receivers 200 through data bus 11. 12 indicates a strobe signal for synchronizing with data transfer, 13 is a data transfer inhibiting signal and 14 is a data/parameter recognition signal for indicating whether data on the data bus 11 is a parameter. 101 is a data memory unit for memorizing and holding data on transmission side. 15 is a data bus on the transmission side and 16 is an address line on transmission side. 201 is a data memory unit for memorizing and holding data on the receiving side. 17 is a data bus on the receiving side and 18 is an address line on the receiving side.

In the data transmitter 100, 102 indicates a data holding unit for holding data read out from the data memory unit 101. 103 is a data holding control unit for reading out data from the data memory unit 101 and for controlling write and holding of data into the data holding unit 102. 104 is data transmission control unit for reading out data held in the data holding unit 102 and sending out the thus read data to the data bus 11.

In the data receiver 200, 202 indicates a data update recognition unit for recognizing, by receiving the strobe signal 12, that data on the data bus 11 is updated. 203 is an identification number holding unit for holding an identification number assigned individually to the data receiver 200. 204 is a control parameter holding unit for holding beforehand control parameter regarding a transfer range of array data. 205 is a transfer allowance judging unit for generating a recognition number address corresponding to a subscript of the array data to be received according to the control parameter held in the control parameter holding unit 204 and for outputting a data transfer allowance signal 19 and a data transfer end signal 20, comparing the thus generated address with the identification number of the identification number holding unit 203. 206 is a first port control unit for receiving a parameter on the data bus 11 and for fetching data on the data bus 11 upon assertion of the data transfer allowance signal 19. 207 is a data selector for making the data holding unit 208 hold the data fetched by the first port control unit 206 and for providing the parameter to the control parameter holding unit 204 and the identification number holding unit 203, according to the data/parameter recognition signal 14. 209 is a data holding control unit for controlling data read and write of the data holding unit 208. 210 is second port control unit for controlling write of data in the data holding unit 208 into the data memory unit 201. 211 is discrete address generation unit for generating an address for data write into the data memory unit 201.

Operation of the data transfer device with the above construction elements according to the first embodiment is discussed next, with reference to FIGS. 2 and 3.

Figure 2:
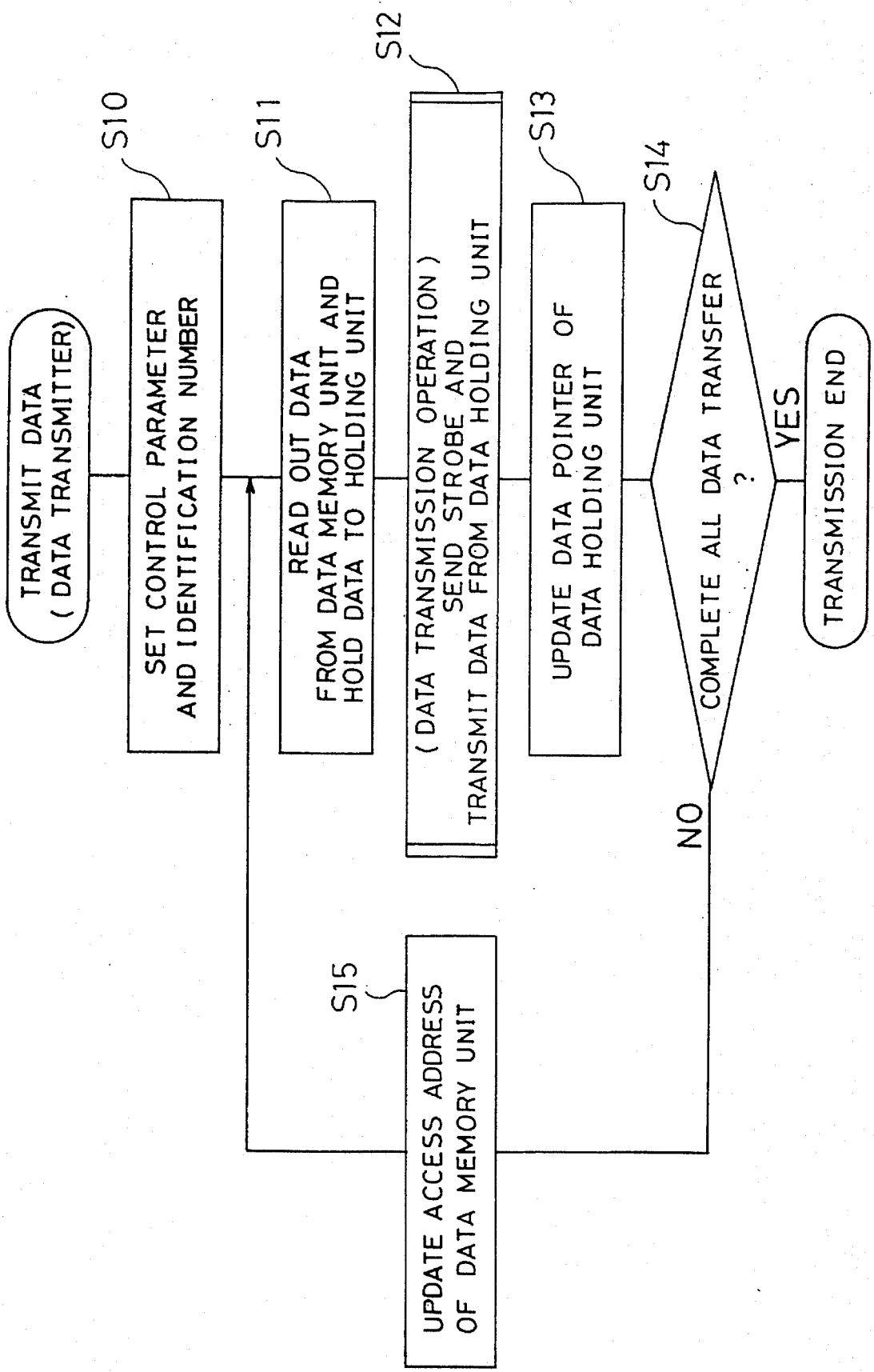
FIG. 2 is a flow chart showing operation of a data transmitter in FIG. 1.

FIG. 2 is a flow chart showing data transmission operation of the data transmitter 100 in FIG. 1. The data transmitter 100 asserts the data/parameter recognition signal 14 onto parameter side, and sets beforehand control parameter regarding the data transfer range to the control parameter holding unit 204 through the data bus 11 prior to real data transfer (step S10). Concurrently, the identification number is set to the identification number holding unit 203. After the parameter setting is completed, the data/parameter recognition signal 14 is asserted onto data side. The data holding control unit 103 makes the data holding unit 102 hold the transmitted data by reading out it from the data memory unit 101 (step S11). The data transmission control unit 104 transmits the strobe signal 12 to the data receiver 200, and transmits the transmitted data held by the data holding unit 102 to the data receiver 200 via the data bus 11 in synchronization with the strobe signal 12 (step S12). The data transmission is limited to a case where the data transfer inhibiting signal 13 is negated from the data receiver 200 side. After the data transmission, the data holding control unit 103 directs the data holding unit 102 to update a data pointer thereof (step S13). The data transmission control unit 104 judges whether data to be transferred has all transferred (step S14). When all been transfers has completed, the transmission operation terminates. If they are not completed, the data address to be transmitted which accesses the data memory unit 101 is updated, returning the process to the step S11 (step S15).

Figure 3:
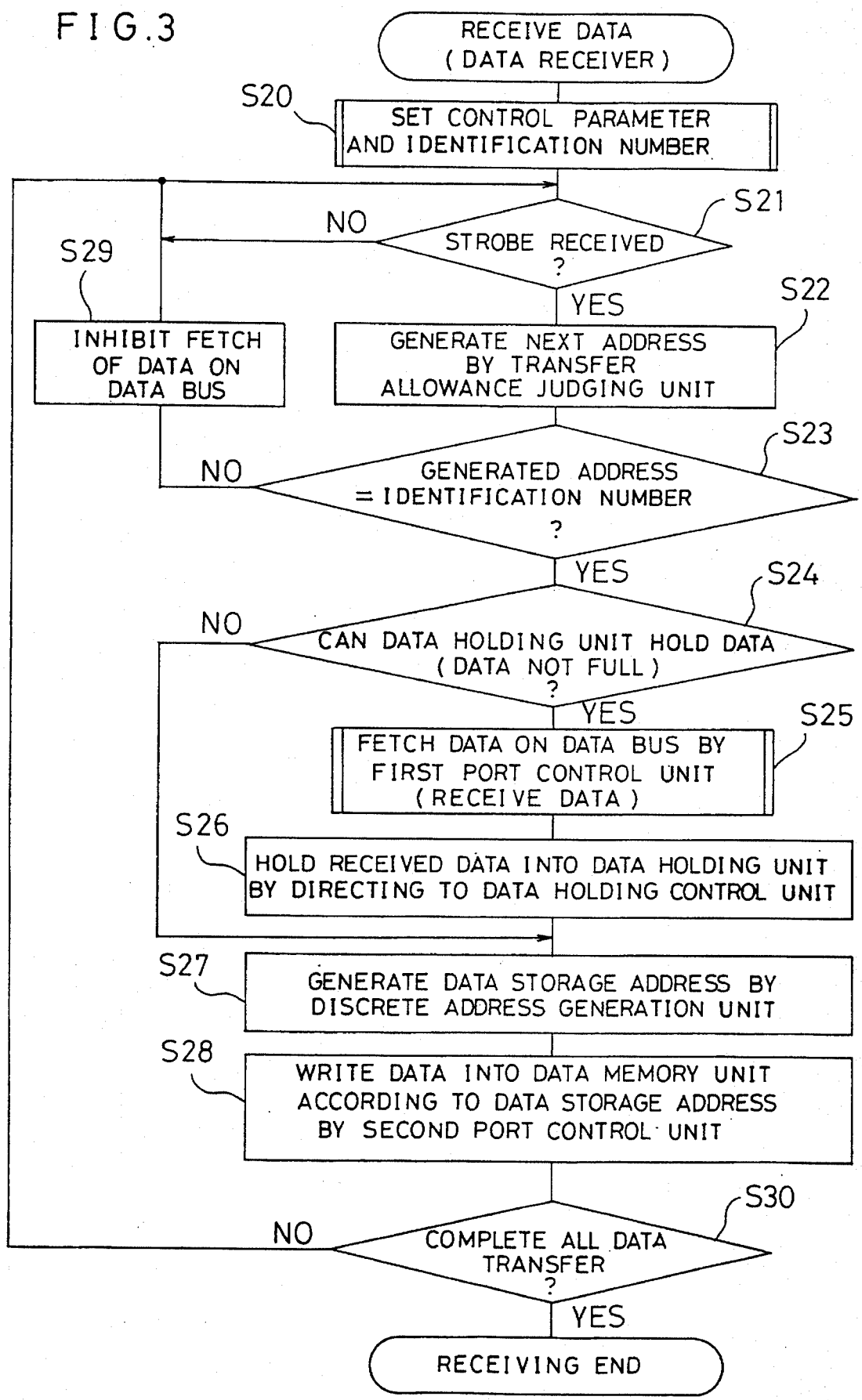
FIG. 3 is a flow chart showing operation of a data receiver in FIG. 1.

FIG. 3 is a flow chart showing data receiving operation of the data receiver 200 in FIG. 1. The data transmitted from the data transmitter 100 according to the flowchart in FIG. 2 is sequentially received by each data receiver 200 of the data receiving elements 250-1–250-n according to the flowchart in FIG. 3. Therefore, the data transmitter 100 asserts the data/parameter recognition signal 14 onto parameter side before the real data transmission and connects the data selector 207 to the control parameter holding unit 204 and the identification number holding unit 203 to set the transfer parameter which indicates the data transfer range and the identification number respectively (step S20). After the setting, the data/parameter recognition signal 14 is asserted onto the data side, and the data bus 11 is connected to the data holding unit 208 via the first port control unit 206 and the data selector 207. The strobe signal 12 sent out from the data transmitter 100 is received at any time in the data update recognition unit 202 to recognize the update of data on the data bus 11 by edge detection of the strobe signal 12 (step S21). In case the strobe signal 12 does not arrive, the step S21 is repeated until the arrival thereof. The data update recognition unit 202 makes the transfer allowance judging unit 205 generate, upon every receiving of the strobe signal 12, the recognition number address according to the parameter held by the control parameter holding unit 204 (step S22).

The recognition number address generated by the transfer allowance judging unit 205 is compared with the identification number set beforehand in the identification number holding unit 203. Upon conformity, the data transfer allowance signal 19 is asserted. The data transfer allowance signal 19 is provided to the first port control unit 206 (step S23). Operation of the transfer allowance judging unit 205 at the steps S22 and S23 is described later in detail, referring to FIG. 4A.

When the negated data transfer allowance signal 19 is notified to the first port control unit 206 as a result of the judgement at step S23, the routine returns to step S21 without fetching of data on the data bus 11 (step S29). Contrarily, when the data transfer allowance signal 19 to the first port control unit 206 is asserted, the first port control means 206 fetches the data on the data bus 11 and notifies the data holding control unit 209 of the presence of the data to make the data holding unit 208 hold the data (steps S25, S26). Wherein, when the data holding unit 207 is full of data at the processing, the data holding control unit 209 notifies that to the first port control unit 206 to send the data transfer inhibiting signal 13 to the data transmitter 100 (step S24).

When the data holding unit 208 holds the data, the discrete address generation unit 211 generates a data storage address (step S27). According to the thus generated storage address, the second port control unit 210 writes the data into the data memory means 201 (step S28). When the judged result of step S24 is that the data cannot be held, namely when the data holding unit 208 is full of data, step S27 and steps thereafter are performed. When one transfer is completed, the transfer allowance judging unit 205 judges whether all data transfers are completed (step S30). When all data transfers are completed, the transfer allowance judging unit 205 asserts the data transfer end signal 20. The data transfer end signal 20 is provided to the data update recognition unit 202 and the discrete address generation unit 211 to stop the operations of the first port control unit 206 and the second port control unit 210, thereby the data receiving operation terminates. When data transfers are not completed yet, the processing starts from the step S21 again.

Figure 4A:
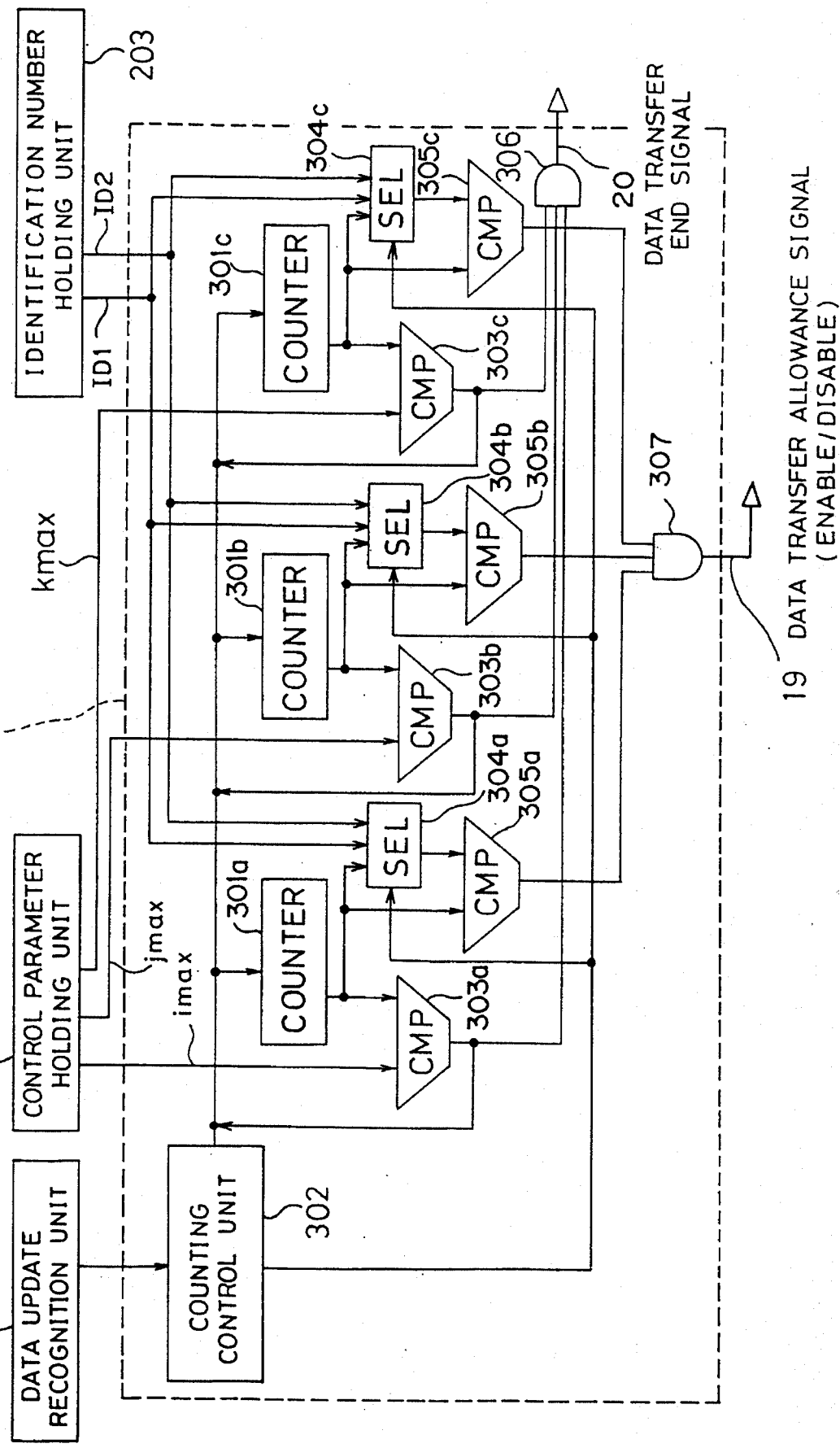
FIG. 4A is a block diagram showing in detail an inside construction of transfer allowance judging means in FIG. 1.

FIG. 4A shows in detail a circuit construction of the transfer allowance judging unit 205 in FIG. 1. In the transfer allowance judging unit 205 in FIG. 4A, reference numerals 301a–301c are counters for executing counting calculation. 302 is counting control unit for controlling counting of the counters 301a–301c. 303a–303c are first comparators for respectively executing comparison calculation whether a counting value of each counter 301a–301c reaches to a set value. 304a–304c are input selectors for selecting and outputting one of three: two identification numbers ID1, ID2 held by the identification number holding unit 203; and one of outputs of the counters 301a–301c. 305a–305c are second comparators for respectively executing comparison calculation of outputs of the input selectors 304a–304c with outputs of the counters 301a–301c. 306 is an AND gate for executing AND calculation of outputs of the first comparators 303a–303c to output the data transfer end signal 20. 307 is an AND gate for executing AND calculation of outputs of the second comparators 305a–305c to output the data transfer allowance signal (ENABLE/DISABLE) 19.

The operation of the transfer allowance judging unit 205 with the above construction is discussed next.

According to the step S10 in FIG. 2 and the step S20 in FIG. 3, information regarding maximum values (imax, jmax, kmax) of the respective subscripts indicating the transfer range of array data and a sequence of change of subscripts is set beforehand to the control parameter holding unit 204. The subscript maximum values are respectively inputted, as respective counting maximum values of the counters 301a–301c, from the control parameter holding unit 204 to the first comparators 303a–303c. The data update recognition unit 202 directs the counting control unit 302, at every recognition of the strobe signal 12, to execute the counting operation of the counters 301a–301c.

The counting operation continues until every counting value of the counters 301a–301c achieves conformity of comparison by the first comparators 303a–303c. Upon conformity of each of the compared results, the data transfer end signal 20 is asserted. During the time, according to the information on the subscript change sequence held by the control parameter holding unit 204, the respective input selectors 304a–304c select the identification number ID1, ID2 as the comparison input values of the second comparators 305a–305c. According to condition, the input selectors 304a–304c select the own counting outputs of the counters 301a–301c as the comparison input values. For example, at a certain time, one input selector 304a selects the counting output of the counters 301a and the other input selectors 304b, 304c respectively select the identification numbers ID1, ID2. When the results of the second comparators 305a–305c are all asserted, the data transfer allowance signal 19 is asserted.

Table 1 indicates a selection rule in each input selector 304a–304c. Each line in the table indicates selection rule corresponding to the subscript change sequence of transfer array data.

TABLE 1

| TRANSFER ARRAY PATTERN | OUTPUT OF INPUT SELECTOR 304a | OUTPUT OF INPUT SELECTOR 304b | OUTPUT OF INPUT SELECTOR 304c |
| --- | --- | --- | --- |
| i<br>u (i, /j, k/) | i | ID2 | ID1 |
| j<br>u (i/, j, /k) | ID1 | j | ID2 |
| k<br>u (/i, j/, k) | ID2 | ID1 | k |

In Table 1, a special indication method is applied to the indication of subscript change sequence of the array. The indication method is discussed. In the transfer array data u(i,/j, k/) in the first line, the subscripts j, k enclosed by two slashes "/" correspond to the eigen-recognition numbers of the processor, which means that first-dimensional array u(i)

is assigned to a processor (k, j). As well, u(i/, j, /k) in the second line and u(/i, j/, k) in the third line mean respectively the assignment of first-dimensional array u(j) to a processor (i, k) and the assignment of first dimensional array u(k) to a processor (j, i). In other words, the subscript enclosed by slashes "/" out of the subscripts of the three-dimensional array is assigned to the processor having the identification numbers corresponding to the subscript. Thereby, the calculation processing of the data regarding three-dimensional array can be performed in parallel at each processor, and calculus of finite differences of partial differential equation can be performed in high speed. For example, as explained in the above-mentioned reference, "Network structure and VLSI implementation for a parallel computer: ADENA", this is a data distribution/arrangement system which enables easy data conversion in ADI method (Alternating Direction Implicit iterative methods) and the like.

The selection rule in each input selector 304a–304c is as follows: the selector having a subscript which changes the fastest selects an output of the own counting means; the selector having a subscript which changes the next fastest selects the first eigen-recognition number ID1; and the selector having a subscript which changes the next fastest to the nest fastest one selects the second identification number ID2.

For example, In the first line of Table 1, the subscript change sequence is: i→j→k. Thus, the data to be respectively compared with the outputs of the counters 301a–301c is: (the subscript of the own counting output, ID2, ID1). In the second line, the data to be composed therewith are (ID1, the subscript thereof, ID2) for the sequence of i→j→k. In the third line, the data to be compared therewith are (ID2, ID1, the subscript thereof) for the sequence of k→j→i. The comparison with the subscript of the own counting output is for making a state where the outputs of the counters 301a–301c are to be always asserted. Wherein, the two identification numbers ID1, ID2 in Table 1 may be alternated with each other.

Table 2 shows a judging calculation process (counting state of counters 301a–301c), contents (E/D) of the data transfer allowance signal 19 and receiving three-dimensional array data in each transfer allowance judging unit 205 when four data receivers 200 on the processor element side receive the three-dimensional array data a(i, j, k) held by the data transmitter 100 on the host processor side.

In the example shown in Table 2, the outputs of the counters 301a–301c in the transfer allowance judging unit 205 are indicated in the form of three items divided by commas ",", so that the first item, the second item and the third item indicate respectively the outputs of the counters 301a, 301b, 301c. A sequence of increment of the counting is: always 301a→301b→301c, and the time proceeds downward. "E" indicates data transfer allowance (ENABLE) and "D" indicates data transfer not-allowance (DISABLE).

In Table 2, the subscript change sequence of the three-dimensional array data a(i, j, k) held by the data transmitter 100 on the host processor side is: i→k→j. This sequence corresponds to the first line in Table 1, thereby the outputs of the input selectors 304a–304c are: the output of the own counters 301a, ID1, and ID2 respectively. As a result, the four data receivers 200 on the processor element side receive the array data shown in Table 2 respectively.

Figure 4B:
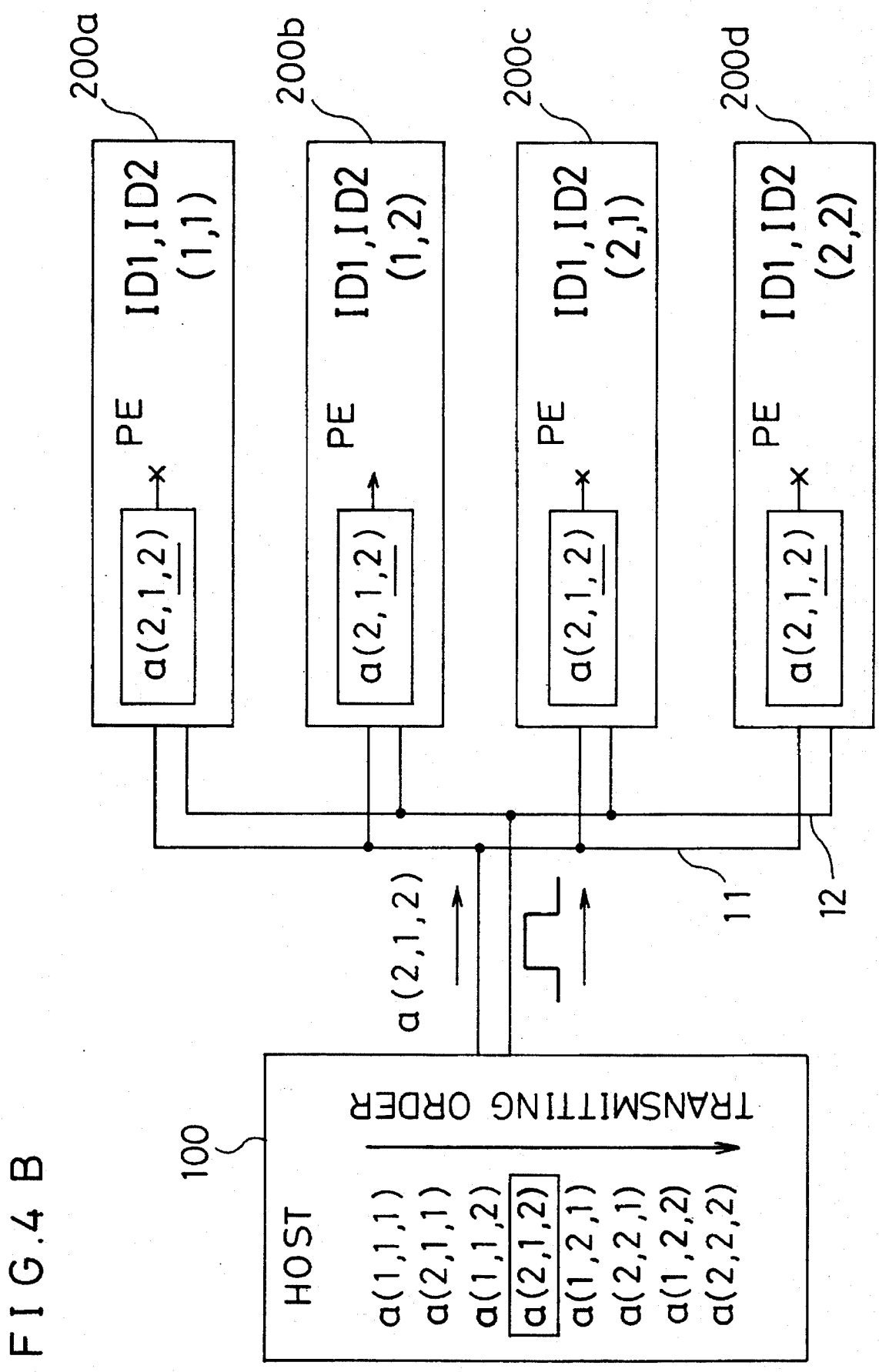
FIG. 4B is an explanatory drawing showing operation of a data transfer device in FIG. 1.

FIG. 4B shows a state where one data receiver 200b out of the four data receivers 200a–200d on processor element side receives data a(2, 1, 2) from the host processor. The data transmitter 100 on host processor side is not required to change a transmission sequence of the three-dimensional array data a(i, j, k) for making each processor element easily receive the data. In other words, the sequence arrangement of the three-dimensional array data a(i, j, k) is unnecessary on host processor side. On the other hand, when a special DMA processor having a function of data re-arrangement is provided at the host processor as an interface to the data bus, layout of the DMA processor is required at every change of the host processor type. Further, it is possible that the host processor performs re-arrangement of the three-dimensional array data a(i, j, k) by executing a special program, but the data transfer rate is lowered.

A setting example of the control parameter regarding the transfer data a(i, j, k) (1≦i, j, k≦2) is indicated below:

data parallel assignment pattern a(i, /j, k/): 1 maximum value of subscript i imax: 2 maximum value of subscript j jmax: 2 maximum value of subscript k kmax: 2

Wherein, the data parallel assignment pattern indicates a(i, /j, k/) as 1, a(i/, j,/k) as 2 and a(/i, j/, k) as 3 respectively.

As described above, the transfer allowance judging unit 205 in FIG. 1 is in the circuit construction shown in FIG. 4A and the input selectors 304a–304c are controlled according

TABLE 2

| HOST PROCESSOR | PROCESSOR ELEMENT | | | |
| --- | --- | --- | --- | --- |
| | (ID1, ID2) = (1, 1) | (ID1, ID2) = (1, 2) | (ID1, ID2) = (2, 1) | (ID1, ID2) = (2, 2) |
| a (1, 1, 1) | 1, 1, 1 - E | 1, 1, 1 - D | 1, 1, 1 - D | 1, 1, 1 - D |
| a (2, 1, 1) | 2, 1, 1 - E | 2, 1, 1 - D | 2, 1, 1 - D | 2, 1, 1 - D |
| a (1, 1, 2) | 1, 2, 1 - D | 1, 2, 1 - E | 1, 2, 1 - D | 1, 2, 1 - D |
| a (2, 1, 2) | 2, 2, 1 - D | 2, 2, 1 - E | 2, 2, 1 - D | 2, 2, 1 - D |
| a (1, 2, 1) | 1, 1, 2 - D | 1, 1, 2 - D | 1, 1, 2 - E | 1, 1, 2 - D |
| a (2, 2, 1) | 2, 1, 2 - D | 2, 1, 2 - D | 2, 1, 2 - E | 2, 1, 2 - D |
| a (1, 2, 2) | 1, 2, 2 - D | 1, 2, 2 - D | 1, 2, 2 - D | 1, 2, 2 - E |
| a (2, 2, 2) | 2, 2, 2 - D | 2, 2, 2 - D | 2, 2, 2 - D | 2, 2, 2 - E |
| | a (1, 1, 1) | a (1, 1, 2) | a (1, 2, 1) | a (1, 2, 2) |
| | a (2, 1, 1) | a (2, 1, 2) | a (2, 2, 1) | a (2, 2, 2) |

Notice)
E: ENABLE,
D: DISABLE to the rule in Table 1, thereby the data receiver 200 can fetch a desired data on the data bus 11, with the independent judgement. The data transmitter 100 sends out data with synchronization with the strobe signal 12 after the transfer data range is set beforehand to the control parameter holding unit 204 of the data receiver 200 via the data bus 11. Thus, the data distribution and arrangement can be easily performed. This data transfer device requires no complicated hardware, and no special packet for data distribution and arrangement.

In this embodiment, one of the inputs of the second comparators 305a–305c is determined by controlling the selection of the input selectors 304a–304c in the transfer allowance judging unit 205 according to the parameter held in the control parameter holding unit 204. However, the identification numbers ID1, ID2 may be provided as comparison input values from the identification number holding unit 203 directly to the second comparators 305a–305c without the input selectors 304a–304c. A counting control sequence of each counter 301a–301c is always fixed in one direction in this embodiment. However, when the counting control sequence is changed based on the parameter regarding the subscript change sequence of the transfer array, the input selectors 304a–304c become unnecessary.

Further, in this embodiment, data are in three-dimensional array, with a result of three counters 301a–301c. The number of counter is arbitrary and may be the number equal to or more than four. The counter may be multiply used by common use to a register or data holding unit.

(SECOND EMBODIMENT)

FIG. 5 is a block diagram showing a construction of a data transfer device according to the second embodiment of the present invention. In the figure, reference numeral 500 indicates a data receiver. 600 is a data transmitter provided in each data transmission element 650-1–650-n. The plural data transmitters 600 transmit data to the data receiver 500 through a data bus 111. Wherein, the data receiver 500 has a function of transmitting a parameter to each data transmitter 600 via the data bus 111. 112 is a strobe signal transmitted from the data receiver 500 for synchronization of data transfer. 113 is a data transfer inhibiting signal. 114 is a data/parameter recognition signal indicating whether data on the data bus 111 is parameter. 110 is an echo of the strobe signal 112. 501 is data memory unit for memorizing and holding data on receiving side. 115 is a data bus on receiving side. 116 is an address line on receiving side. 601 is data memory unit for memorizing and holding data on transmission side. 117 is a data bus on transmission side. 118 is an address line on transmission side.

In the data receiver 500, 504 indicates data receiving control unit for receiving and controlling data on the data bus 111 by a feedbacked strobe echo 110 and for controlling data write into the data memory unit 501 by driving the address line 116. 502 is data holding unit for holding data received by the data receiving control unit 504. 503 is data holding control unit for controlling data holding of the data holding unit 502.

In the data transmitter 600, 602 is data update recognition unit for recognizing that data update is required upon receiving of the strobe signal 112. 603 is identification number holding unit for holding identification number assigned individually to the data transmitter 600. 604 is control parameter holding unit for holding a transfer range of array data as control parameter. 605 is transfer allowance judging unit for generating a recognition number address corresponding to the subscript of array data to be transmitted according to the control parameter held by the control parameter holding unit 604, and for outputting the data transfer allowance signal 119 and the data transfer end signal 120, comparing the thus generated address with the identification number of the identification number holding unit 603. The transfer allowance judging unit 605 has the same circuit construction as in FIG. 4A. 606 is first port control unit for receiving parameter on the data bus 111, and for transmitting data to the data bus 11 upon assertion of the data transfer allowance signal 119. 607 is a data selector for making transmission of the data held by the data holding unit 608 to the first port control unit according to the data/parameter recognition signal 114, and for providing the parameter received by the first port control unit 606 to the control parameter holding unit 604 and the identification number holding unit 603. 609 is data holding control unit for controlling data write of the data holding unit 608. 611 is discrete address generation unit for generating a data readout address from the data memory unit 601. 610 is second port control unit for reading out data from the data memory unit 601 and directing the data holding control unit 609 to hold the data read out to the data holding unit 608.

Operation of the data transfer device with the above construction according to the second embodiment is discussed next, with reference to FIGS. 6 and 7.

Figure 6:
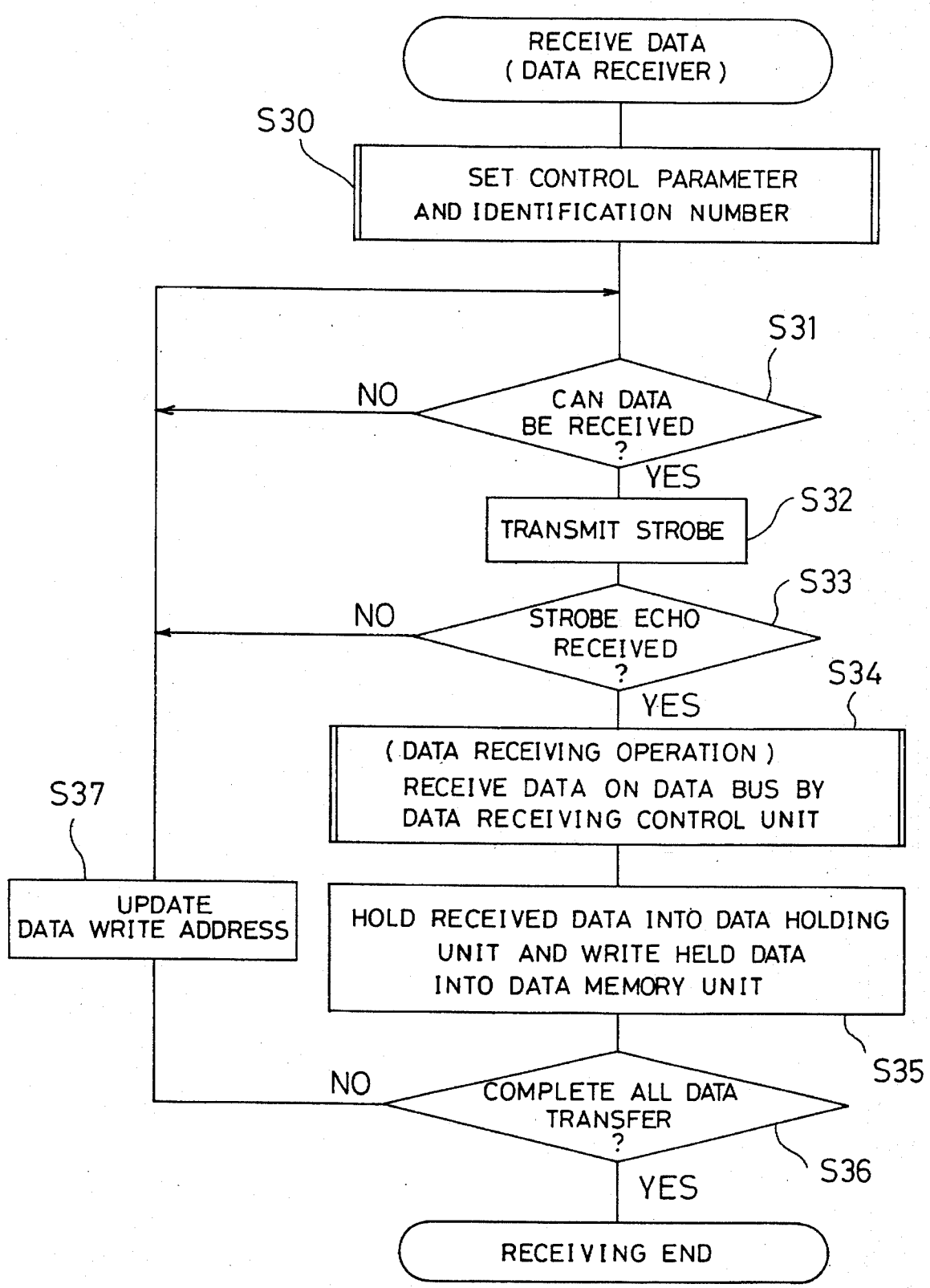
FIG. 6 is a flow chart showing operation of a data receiver in FIG. 5.

FIG. 6 is a flow chart showing data receiving operation of the data receiver 500 in FIG. 5. The data receiver 500 asserts the data/parameter recognition signal 114 onto the parameter side, and sets beforehand the control parameter regarding the data transfer range, prior to the real data transfer, to the control parameter holding unit 604 via the data bus 111 (step S30). At the same time, the identification number is set to the identification number holding unit 603. After the parameter setting is completed, the data/parameter recognition signal 114 is asserted onto data side. The data receiving control unit 504 monitors the state of the data holding control unit 502 and the data bus 115 on receiving side to judge whether data can be received (step S31). When the data can be received, the strobe signal 12 is issued to the data transmitter 600 (set pS32). Then, judged is whether the strobe echo 110 is to be received from the data transmitter 600 (step S33). When the strobe echo 110 is received, the data receiving control unit 504 receives the data on the data bus 111, and directs the data holding control unit 503 to make the data holding unit 502 hold the data (step S34). The data in the data holding unit 502 is written into the data memory unit 501 according to the address generated by the data receiving control unit 504 (step S35). Then, the data receiving control unit 504 judges whether all data transfers are completed (step S36). If the data transfers are not completed yet, the data write address is updated (step S37), returning the routine to the step S31.

Figure 7:
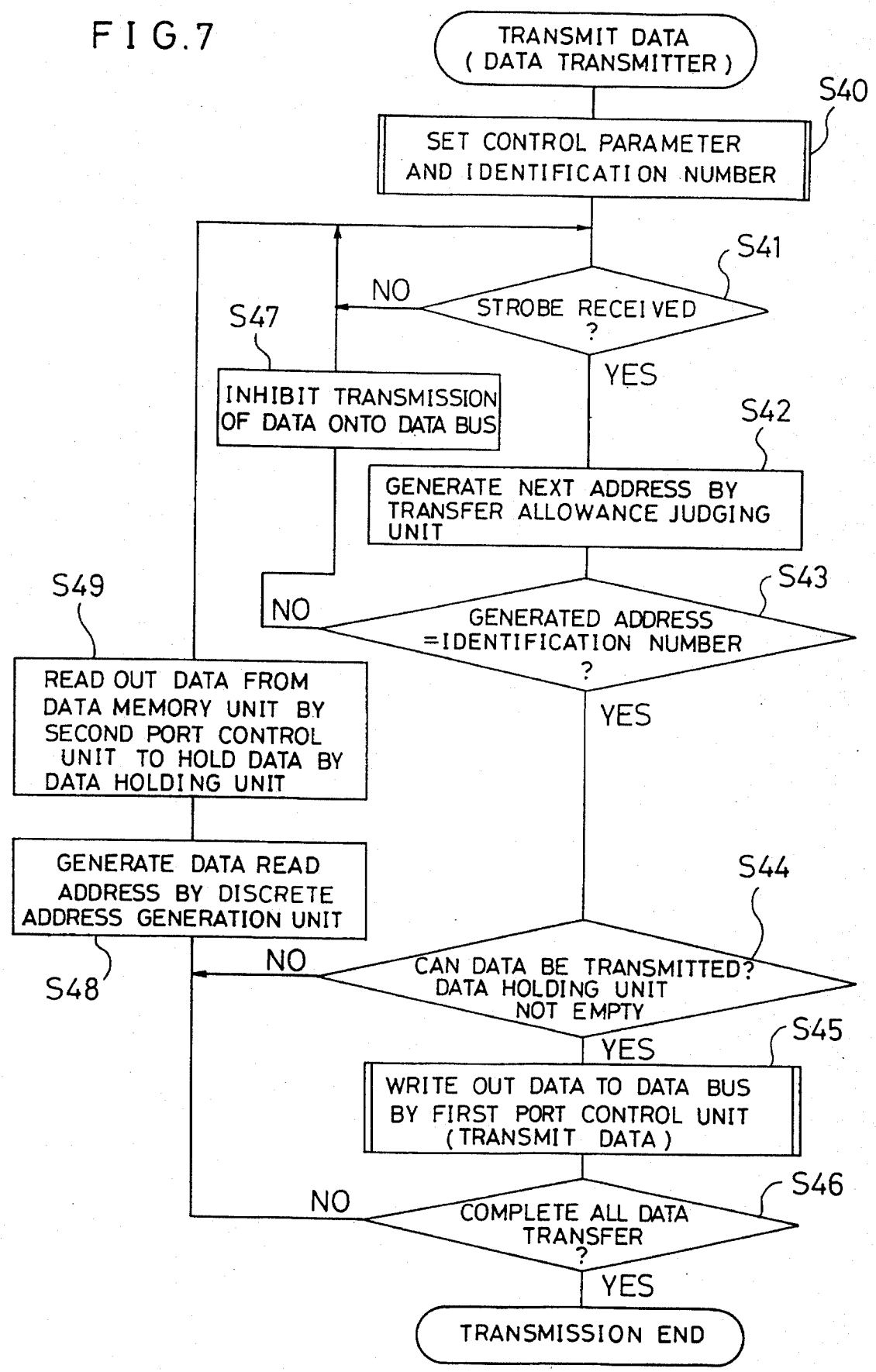
FIG. 7 is a flow chart showing operation of a data transmitter in FIG. 5.

FIG. 7 is a flow chart showing data transmission operation of the data transmitter 600. The data transmitted from each data transmitter 600 of the data transmission elements 650-1–650-n according to the flow in FIG. 7 are sequentially received by the data receiver 500 according to the flow in FIG. 6. Therefore, the data receiver 500 asserts beforehand the data/parameter recognition signal 114 onto parameter side, sets the control parameter regarding the data transfer range to the control parameter holding unit 204, and sets the identification number to the identification number holding unit 603. After the setting, the data receiver 500 asserts the data/parameter recognition signal 114 onto data side (step S40). The strobe signal 112 sent out from the data receiver 500 is received by the data update recognition unit 602 to executed data update recognition (step S41). The notification from the data update recognition unit 602 to the transfer allowance judging unit 605 is performed at every receiving of the strobe signal 112, and the recognition number address is generated by the transfer allowance judging unit 605 according the parameter held by the control parameter holding unit 604 (step S42).

The recognition number address generated by the transfer allowance judging unit 605 is compared with the identification number set beforehand in the identification number holding unit 603 (step S43). Upon non-conformity, the data transfer allowance signal 119 to the first port control unit 606 is negated, with a result that the data transmission to the data bus 111 is inhibited (step S47). When the data transfer allowance signal 119 is asserted upon conformity, whether the data holding unit 608 has a transmittable data is checked (step S44). With a transmittable data, the data is sent out to the data buss 111, directing the first port control unit 606 (step S45). Without a transmittable data (data empty), data to be transmitted is prepared (steps S48 and S49). When the data transmission is executed (step S45), the transfer allowance judging unit 605 judges whether all transfers are completed (step S46). When all data transfers are completed, the transfer allowance judging unit 605 asserts the data transfer end signal 120. The data transfer end signal 120 is provided to the data update recognition unit 602 and the discrete address generation unit 611 to stop the operations of the first port control unit 602 and the second port control unit 610, thus the data transmission operation terminates. If the data transfers are not completed, the discrete address generation unit 611 generates an address regarding data read of the data memory unit 601 (step S48). The second port control unit 610 reads out data from the data memory unit 601 according to the thus generated address, and directs the data holding control unit 609 to write the thus read out data to the data holding unit 208 (step S49). The above operation is continued until transmissions of data to be transferred are completed.

As a result of the above transmission and receiving operations, the three-dimensional array data are transferred in a direction (from each processor element to the host processor) reverse to the case in Table 2 by the same judging calculation process as in the first embodiment in each transfer allowance judging unit 605. Further, according to the data transmitter 600 in FIG. 5, the transfer allowance judging unit 605 in each data transmission element 650-1–650-n judges individually whether the data is transmittable only with the transmission of the strobe signal 112 after the data receiver 500 sets beforehand the transfer data range to the control parameter holding unit 604 of each data transmission element 650-1–650-n via the data bus 111. As a result, the data receiver 500 needs no complicated hardware, such as a switch, a control line, for selecting and controlling the plural data transmission elements 650-1–650-n at every transmission. Further, since no special packet control mechanisms for requiring data to each data transmission element 650-1–650-n are required, high-speed data collection is easily attained by continual data transfer without hardware overhead regarding the selection of data transmission elements and data transfer control and overhead for packet control.

In this embodiment, the data receiver 500 serves as a control master for transmitting the strobe signal 112 to the data transmitters 600. However, the data transmitters 600 may serve as the master.

(THIRD EMBODIMENT)

Figure 8:
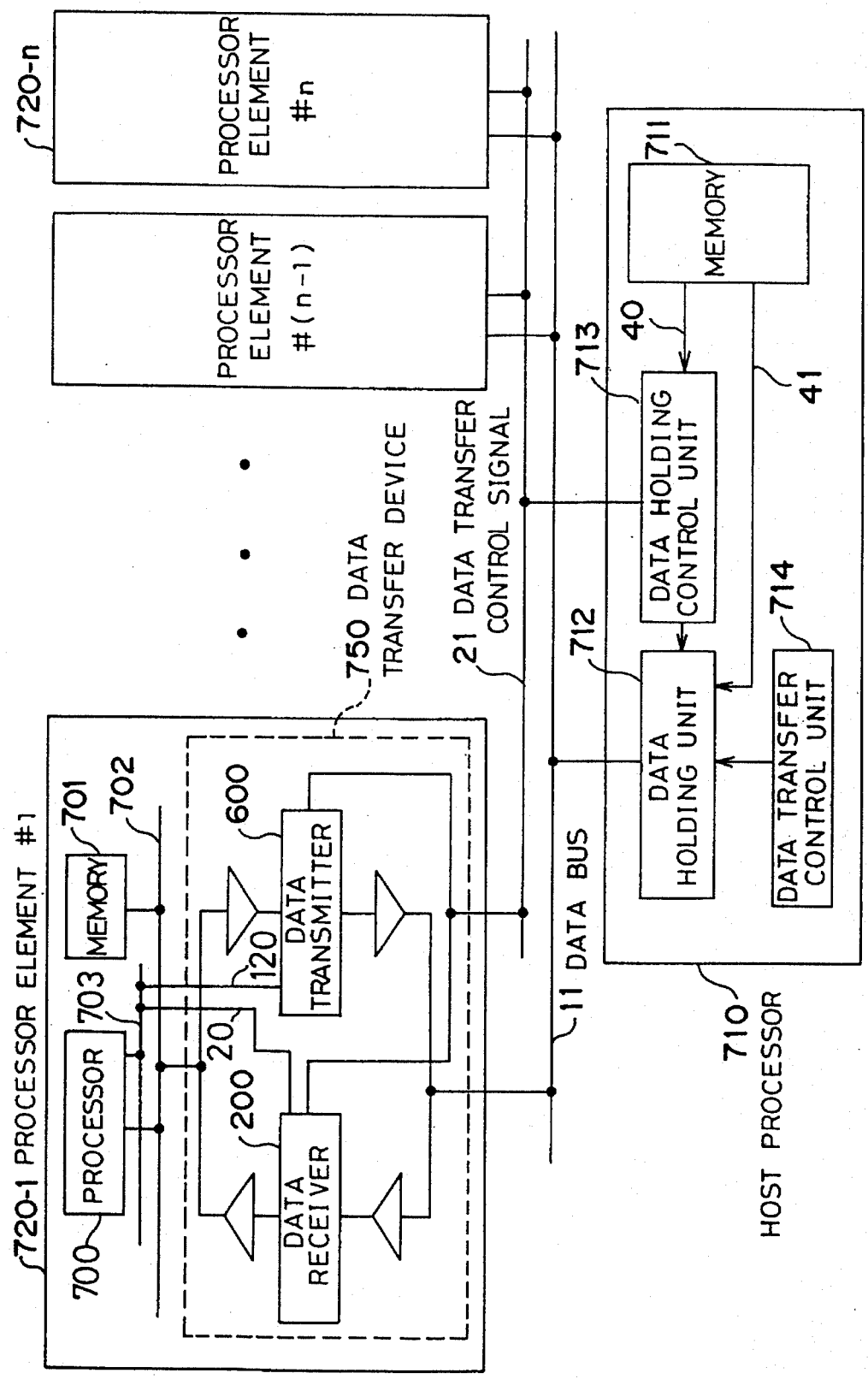
FIG. 8 is a block diagram showing a construction of a data transfer device and a multiprocessor system according to a third embodiment of the present invention.

FIG. 8 shows a construction of a data transfer device and a multiprocessor system according to the third embodiment of the present invention. In the figure, the multiprocessor system is composed of a host processor 710 and processor elements 720-1–720-n of n in number. Reference numeral 11 indicates a data bus between the host processor 710 and the n multiprocessor elements 720-1–720-n. 21 is a data transfer control signal which is a total name of the strobe signal, the data transfer inhibiting signal, the data/parameter recognition signal and the strobe echo in first and second embodiments.

In each processor element 720-1–720-n, 700 is a processor. 701 is a memory. 702 is an internal bus. 703 is an interrupt signal line. 750 is a data transfer device. The data transfer device 750 includes the data receiver 200 in the first embodiment (FIG. 1) and the data transmitter 600 in the second embodiment (FIG. 5).

In the host processor 710, 711 is a memory. 40 is a data bus. 41 is an address line. 712 is data holding unit for temporarily holding data of the memory 711. 713 is data holding control unit for controlling data holding of the data holding unit 712. 714 is data transfer control unit for governing data transfer control between the host processor 710 and the processor elements 720-1–720-n.

Hereinafter discussed is data transfer operation of the multiprocessor system shown in FIG. 8 in case where the above-mentioned formulae (1)–(3) are subsequently executed using three-dimensional array data stored in the memory 711 of the host processor 710.

First, in order to execute in parallel the calculation of the formula (1) in the n processor elements 720-1–720-n, the data transfer control unit 714 of the host processor 710 read out data, accessing the memory 711. The thus read out data is held in the data holding unit 712 by control of the data holding control unit 713. The data transfer control unit 714 sends out the strobe signal as the data transfer control signal 21 and sends out the data via the data bus 11 to each processor element 720-1–720-n. The data receiver 200 of each processor element 720-1–720-n fetches the data on the data bus 11 to write the data into the memory 701 according to the individual judgement, upon every receiving of the strobe signal, by the transfer allowance judging unit 205 whether the data can be received. When all transfers are completed in the processor elements 720-1–720-n, each processor 700 receives the asserted data transfer end signal 20 from the data receiver 200 via each interrupt signal line 703. In this way, when the data transfer end is notified, the formula (1) is calculated in each processor 700.

When the calculation of the formula (1) is completed, the host processor must collect the data distributed and arranged in each processor element 720-1–720-n for the calculation of the formula (2). Therefore, the data transfer control unit 714 of the host processor 710 sends out the strobe signal to each processor element 720-1–720-n according to the flow in FIG. 6, and receive the data according to the returned strobe echo. In each processor element 720-1–720-n, each data transmitter 600 executes the data transmission operation according to the flow in FIG. 7, thereby the host processor 710 collects the data distributed and arranged to each processor element 720-1–720-n. At this time, when the data transmission in the memory 7101 is completed in each processor element 720-1–720-n, each processor 700 receives the asserted data transfer end signal 120 from the data transmitter 600 via each interrupt signal line 703. On the other hand, the host processor 710 executes the calculation of the formula (2) based on the collected data.

Referring to the calculation of the formula (3), since the parallel processing can be performed in each processor element 720-1–720-n, the host processor 710 executes the calculation, distributing and arranging the data to each processor element 720-1–720-n by the same method as the case in the calculation of the formula (1).

As described above, the multiprocessor system is composed of the processor elements 720-1–720-n each having the functions of data receiver 200 in the first embodiment and of data transmitter 600 in the second embodiment. Thereby, the data distribution, arrangement and collection are easily performed at execution of the sequential processing such as the calculation of formula (2) and the parallel processing such as the calculation of formulae (1) and (3), and switches and control signals for selecting each processor element become unnecessary. Further, since an independent control signal line in every processor element is unnecessary, high scalability of the multiprocessor system is obtainable, contemplating a high-performance multiprocessor system.

In addition, the function of data collection by plural processor elements (data gathering) cannot be performed conventionally only with packet. However, according to this embodiment, the data race is prevented and data collection operation is performed easily by the individual judgement, whether the data can be transmitted, by the data transmitter 600 of each processor element 720-1–720-n. Further, compared with the multiprocessor which performs data transfer with use of the conventional packet, the hardware is remarkably reduced, and the reliability and operation speed are high. Since the mechanism is common in each processor element 720-1–720-n, the data transfer device can be easily build in VLSI.

(FOURTH EMBODIMENT)

In the fourth embodiment, array data which is larger than the number of physical elements is contemplated to be processed by multiply assigning the array data to the data receiving elements 250-1–250-n in the first embodiment (FIG. 1), the data transmission elements 650-1–650-n in the second embodiment (FIG. 5) or the processor elements 720-1–720-n in the third embodiment (FIG. 8).

Figure 11:
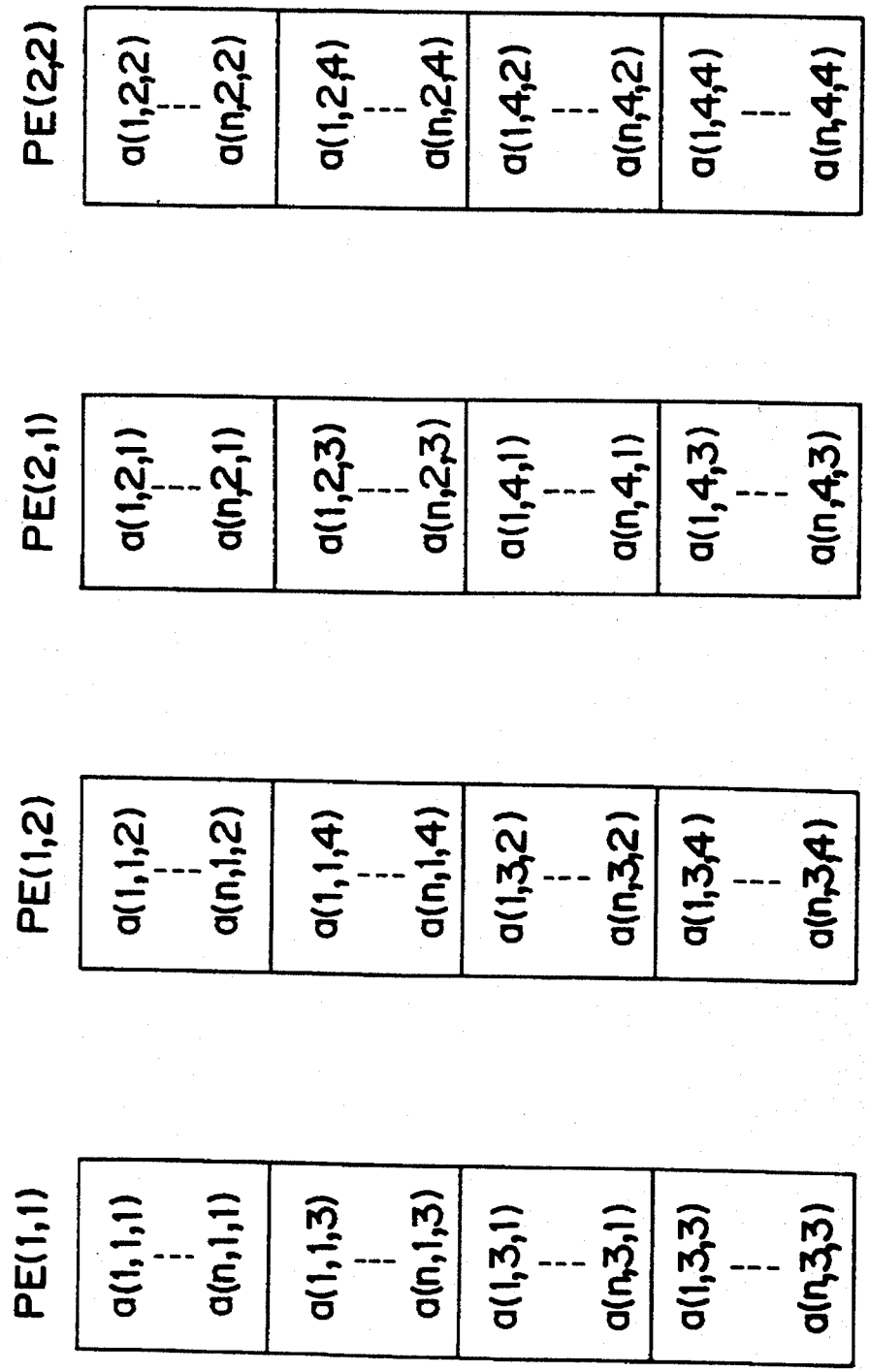
FIG. 11 is a memory map of data multiple assignment to four processor elements.
Figure 13:
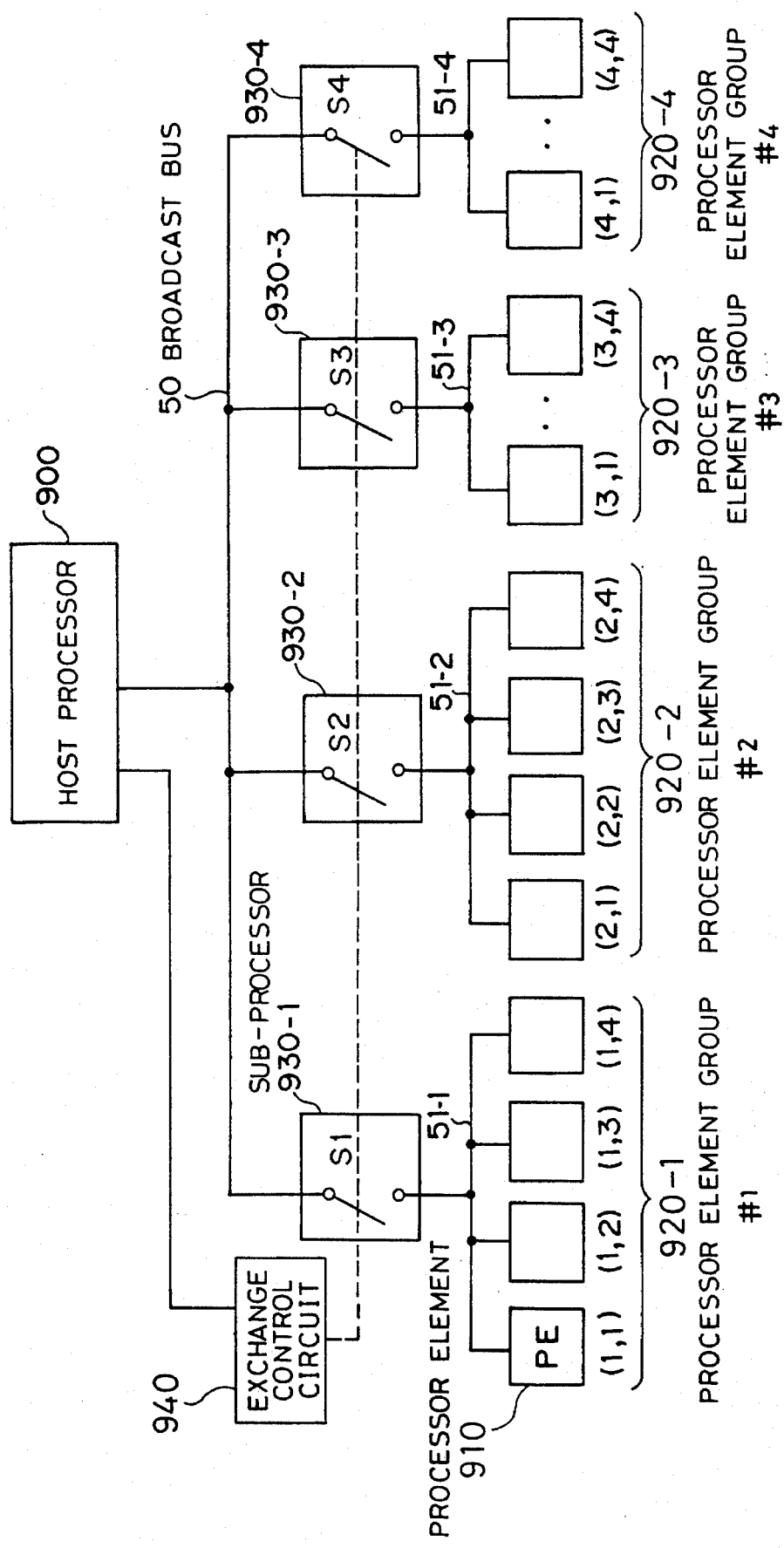
FIG. 13 is a block diagram showing a construction of a conventional multiprocessor.
Figure 14:
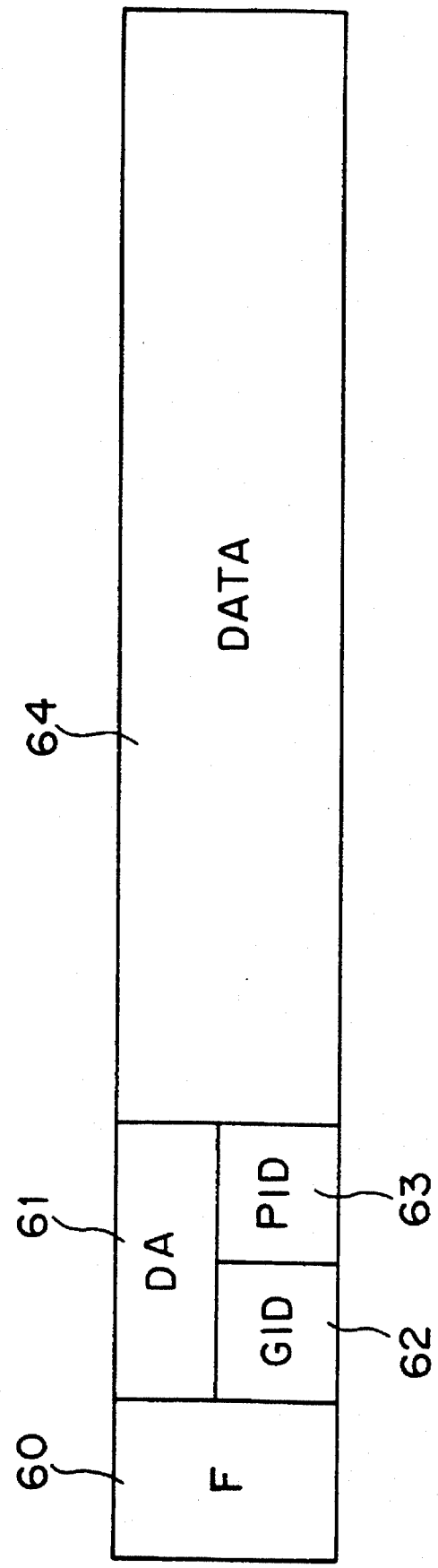
FIG. 14 is an explanatory drawing of data packet in a conventional multiprocessor.
Figure 15:
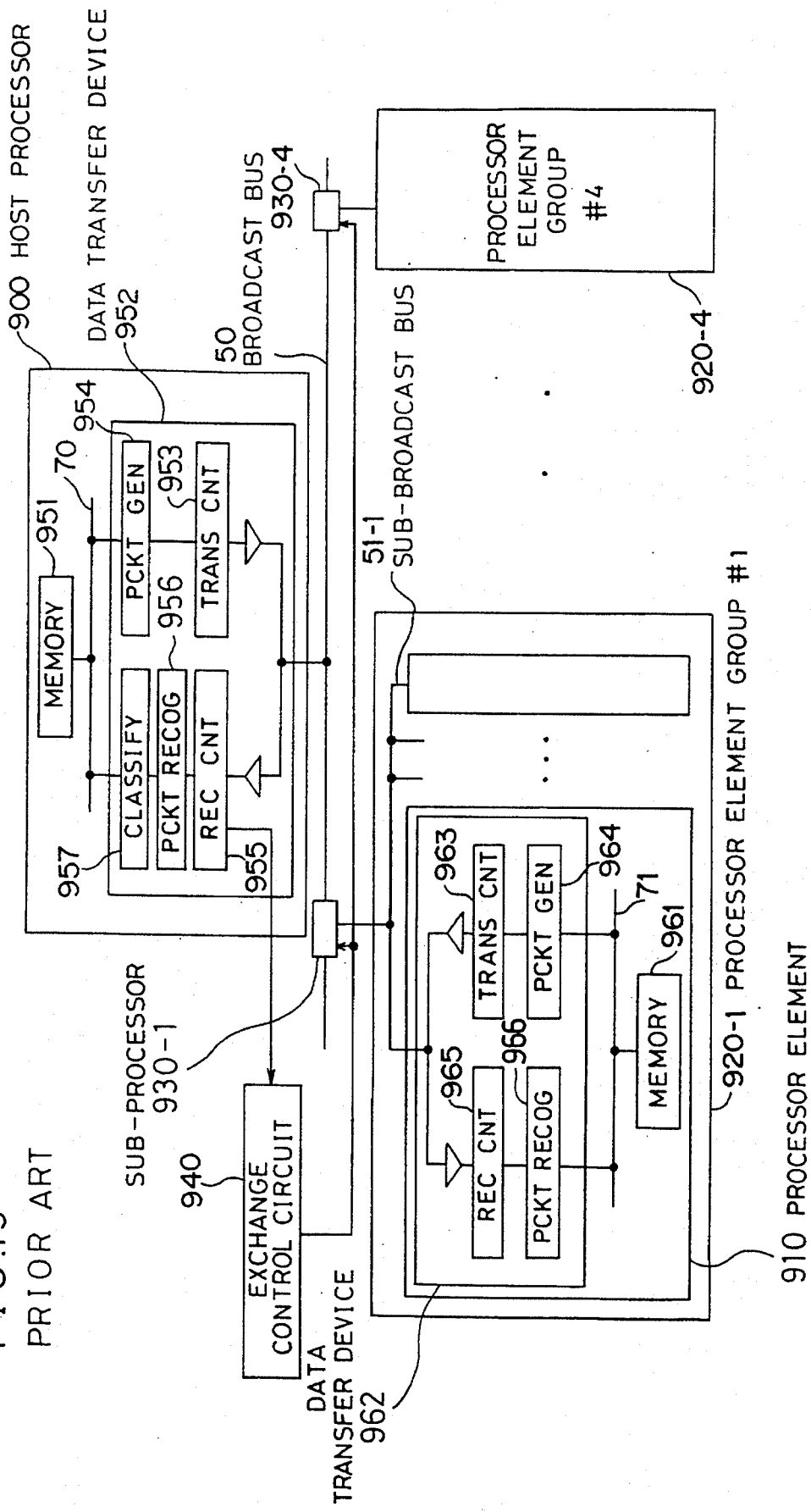
FIG. 15 is a block diagram showing a construction of a conventional multiprocessor system using the data packet in FIG. 14.

Hereinafter discussed is the fourth embodiment, with reference to FIGS. 9–11.

Figure 9:
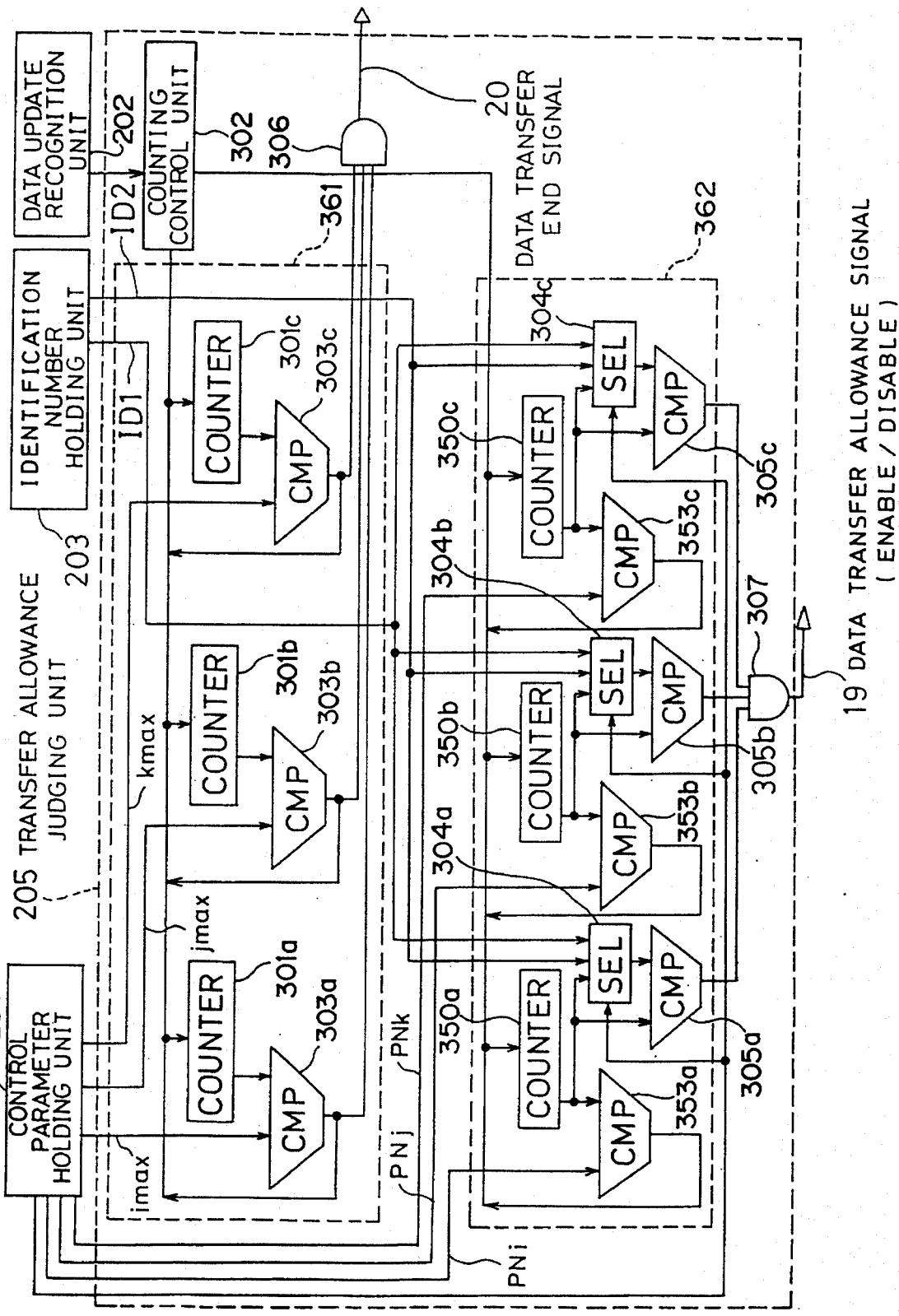
FIG. 9 is a block diagram showing in detail an inside construction of transfer allowance judging means used in a data transfer device according to a fourth embodiment of the present invention.

The transfer allowance judging unit 205 shown in FIG. 9 has cycle counting unit for executing cycle counting until a set value in addition to the construction of the transfer allowance judging unit in FIG. 4A. In FIG. 9, a first section 361 for outputting the data transfer end signal 20 via the AND gate 306 includes, as well as the construction in FIG. 4A, the first counters 301a–301c and the first comparators 303a–303c. On the other hand, a second section 362 for outputting the data transfer allowance signal 19 via the AND gate 307 includes the second counters 350-a–350c and third comparators 353a–535c which are provided for executing cycle counting, in addition to the input selectors 304a–304c and the second comparators 305a–305c.

The additionally provided second counters 350a–350c are for executing counting by the number of physical processors. The counting control unit 302 controls counting of the second counters 350a–350c together with counting control of the first counters 301a–301c. The third comparators 353a–353c compare the number of physical processors which is held beforehand in the control parameter holding unit 204 with outputs of the second counters 350a–350c and feedback the results to the second counters 350a–350c to make the second counters 350a–350c execute the cycle counting. The input selectors 304a–304c select, according to the parameter regarding the subscript change sequence of the transfer array data held in the control parameter holding unit 204, one among the identification numbers ID1, ID2 and outputs of the second counters 350a–350c. The second comparators 305a–305c compare the outputs of the second counters 350a–350c with the outputs of the input selectors 304a–304c. In detail, the identification numbers ID1, ID2 held in the identification number holding unit 203 are compared with, instead of the outputs of the first counters 301a–301c, the outputs of the second counters 350a14 350c by the second comparators 305a–305c for the cycle counting. The outputs of the second comparators 305a–305c are outputted as the data transfer allowance signal (ENABLE/ DISENABLE) 19 according to the AND calculation of the AND gate 307.

FIG. 10 explains an example that the processor elements are virtually increased in number by assigning respectively four times the array data to four processor elements PE(1, 1)–PE(2, 2) physically existing as the data receiving elements each having the transfer allowance judging unit 205 in FIG. 9 so that a large-sized three dimensional array data are processed. In the figure, 760 indicates a physical processor element group composed of four elements. 761–763 are virtual processor element groups virtually increased by multiply assigning the respective physical processor element groups 760. FIG. 11 shows, in the form of memory map, a state that the transfer array data are held in the memory of each processor element PE(1, 1)–PE(2, 2).

As shown in FIG. 10, the three-dimensional array data are multiply assigned as first-dimensional array data to each processor element PE(1, 1)–PE(2, 2) having two-dimensional identification number. The array data are assigned so that, for example, the processor element PE(1, 1) serves as the processor elements PE(1, 3), PE(3, 1), PE(3, 3). At this time, as shown in FIG. 11, if the data is held to each processor element in the form of plural segments, the data management is facilitated. Concretely, the data access can be managed by the discrete address generation means 211 (refer to FIG. 1).

Described next is about operation of the transfer allowance judging unit 205 having the construction in FIG. 9.

In addition to the information regarding maximum values (imax, jmax, kmax, e.g. 4) of each subscript indicating the transfer range of the array data and the subscript change sequence, the number of the physical processor elements per subscript direction, i.e., the number of the physical processor (PNi, PNj, PNk, e.g. 2) is set beforehand to the control parameter holding unit 204. The number of the physical processor elements which is held by the control parameter holding unit 204 is inputted to the third comparators 353a–353c for the cycle counting. Upon every input of the strobe signal, the second counters 350a–350c are directed by the counting control unit 302 to execute the counting calculation, as well as the first counters 301a–301c. At this time, the second counters 350a–350c are made to execute the cycle calculation by the number of the physical processors according to the output of the third comparators 353a–353c. The input selectors 304a–304c operate according to the rule in Table 1. The outputs of the input selectors 304a–304c are compared with the outputs of the second counters 350a–350c by the second comparators 305a–305c respectively, then the data transfer allowance signal 19 is sequentially outputted according to the compared results. On the other hand, the first counters 301a–301c execute counting by the respective subscript maximum values set in the control parameter holding means 204. Then, the data transfer end signal 20 is outputted upon conformity in every first comparator 303a–303c.

The judging calculation process in the transfer allowance judging means 205 in each processor element PE(1, 1)–PE(2, 2) shown in FIG. 10 is indicated in Table 3 and Table 4.

TABLE 3

| OUTPUT OF SECOND COUNTING MEANS 350a–c | OUTPUT OF FIRST COUNTING MEANS 301a–c | DATA TRANSFER ALLOWANCE SIGNAL (ENABLE/DISABLE) | | | |
|---|---|---|---|---|---|
| | | (ID1, ID2) = (1, 1) | (ID1, ID2) = (1, 2) | (ID1, ID2) = (2, 1) | (ID1, ID2) = (2, 2) |
| 1, 1, 1 | 1, 1, 1 | E | D | D | D |
| 2, 1, 1 | 2, 1, 1 | E | D | D | D |
| 3, 1, 1 | 3, 1, 1 | E | D | D | D |
| 4, 1, 1 | 4, 1, 1 | E | D | D | D |
| 1, 2, 1 | 1, 2, 1 | D | E | D | D |
| 2, 2, 1 | 2, 2, 1 | D | E | D | D |
| 3, 2, 1 | 3, 2, 1 | D | E | D | D |
| 4, 2, 1 | 4, 2, 1 | D | E | D | D |
| 1, 1, 1 | 1, 3, 1 | E | D | D | D |
| 2, 1, 1 | 2, 3, 1 | E | D | D | D |
| 3, 1, 1 | 3, 3, 1 | E | D | D | D |
| 4, 1, 1 | 4, 3, 1 | E | D | D | D |
| 1, 2, 1 | 1, 4, 1 | D | E | D | D |
| 2, 2, 1 | 2, 4, 1 | D | E | D | D |
| 3, 2, 1 | 3, 4, 1 | D | E | D | D |
| 4, 2, 1 | 4, 4, 1 | D | E | D | D |
| 1, 1, 2 | 1, 1, 2 | D | D | E | D |
| 2, 1, 2 | 2, 1, 2 | D | D | E | D |
| 3, 1, 2 | 3, 1, 2 | D | D | E | D |
| 4, 1, 2 | 4, 1, 2 | D | D | E | D |
| 1, 2, 2 | 1, 2, 2 | D | D | D | E |
| 2, 2, 2 | 2, 2, 2 | D | D | D | E |
| 3, 2, 2 | 3, 2, 2 | D | D | D | E |
| 4, 2, 2 | 4, 2, 2 | D | D | D | E |
| 1, 1, 2 | 1, 3, 2 | D | D | E | D |
| 2, 1, 2 | 2, 3, 2 | D | D | E | D |
| 3, 1, 2 | 3, 3, 2 | D | D | E | D |
| 4, 1, 2 | 4, 3, 2 | D | D | E | D |
| 1, 2, 2 | 1, 4, 2 | D | D | D | E |
| 2, 2, 2 | 2, 4, 2 | D | D | D | E |
| 3, 2, 2 | 3, 4, 2 | D | D | D | E |
| 4, 2, 2 | 4, 4, 2 | D | D | D | E |

TABLE 4

| OUTPUT OF SECOND COUNTING MEANS 350a–c | OUTPUT OF FIRST COUNTING MEANS 301a–c | DATA TRANSFER ALLOWANCE SIGNAL (ENABLE/DISABLE) | | | |
|---|---|---|---|---|---|
| | | (ID1, ID2) = (1, 1) | (ID1, ID2) = (1, 2) | (ID1, ID2) = (2, 1) | (ID1, ID2) = (2, 2) |
| 1, 1, 1 | 1, 1, 3 | E | D | D | D |
| 2, 1, 1 | 2, 1, 3 | E | D | D | D |
| 3, 1, 1 | 3, 1, 3 | E | D | D | D |
| 4, 1, 1 | 4, 1, 3 | E | D | D | D |
| 1, 2, 1 | 1, 2, 3 | D | E | D | D |
| 2, 2, 1 | 2, 2, 3 | D | E | D | D |
| 3, 2, 1 | 3, 2, 3 | D | E | D | D |
| 4, 2, 1 | 4, 2, 3 | D | E | D | D |
| 1, 1, 1 | 1, 3, 3 | E | D | D | D |
| 2, 1, 1 | 2, 3, 3 | E | D | D | D |
| 3, 1, 1 | 3, 3, 3 | E | D | D | D |
| 4, 1, 1 | 4, 3, 3 | E | D | D | D |
| 1, 2, 1 | 1, 4, 3 | D | E | D | D |

TABLE 4-continued

| OUTPUT OF SECOND COUNTING MEANS 350a–c | OUTPUT OF FIRST COUNTING MEANS 301a–c | DATA TRANSFER ALLOWANCE SIGNAL (ENABLE/DISABLE) | | | |
|---|---|---|---|---|---|
| | | (ID1, ID2) = (1, 1) | (ID1, ID2) = (1, 2) | (ID1, ID2) = (2, 1) | (ID1, ID2) = (2, 2) |
| 2, 2, 1 | 2, 4, 3 | D | E | D | D |
| 3, 2, 1 | 3, 4, 3 | D | E | D | D |
| 4, 2, 1 | 4, 4, 3 | D | E | D | D |
| 1, 1, 2 | 1, 1, 4 | D | D | E | D |
| 2, 1, 2 | 2, 1, 4 | D | D | E | D |
| 3, 1, 2 | 3, 1, 4 | D | D | E | D |
| 4, 1, 2 | 4, 1, 4 | D | D | E | D |
| 1, 2, 2 | 1, 2, 4 | D | D | D | E |
| 2, 2, 2 | 2, 2, 4 | D | D | D | E |
| 3, 2, 2 | 3, 2, 4 | D | D | D | E |
| 4, 2, 2 | 4, 2, 4 | D | D | D | E |
| 1, 1, 2 | 1, 3, 4 | D | D | E | D |
| 2, 1, 2 | 2, 3, 4 | D | D | E | D |
| 3, 1, 2 | 3, 3, 4 | D | D | E | D |
| 4, 1, 2 | 4, 3, 4 | D | D | E | D |
| 1, 2, 2 | 1, 4, 4 | D | D | D | E |
| 2, 2, 2 | 2, 4, 4 | D | D | D | E |
| 3, 2, 2 | 3, 4, 4 | D | D | D | E |
| 4, 2, 2 | 4, 4, 4 | D | D | D | E |

In Table 3 and Table 4, the outputs of the second counters 350a–350c are divided into three items by ",", wherein the first, the second and the third items from the left indicate respective outputs of the second counting means 350a, 350b and 350c. In the column of outputs of the first counters 301a–301c, the first, the second and the third items from the left corresponds to the second counters 301a, 301b and 301c respectively. According to the process in Table 3 and Table 4, the data arrangement shown in FIGS. 10 and 11 can be performed with the four processor elements PE(1, 1)–PE(2, 2) physically existing as each data receiving element. As well, when the transfer allowance judging unit 205 in FIG. 9 is provided to the data transmission elements 650-1–650-n in the second embodiment (FIG. 5) or the processor elements 720-1–720-n in the third embodiment (FIG. 8), the array data larger than the number of the physical elements can be processed.

(FIFTH EMBODIMENT)

FIG. 12 shows a construction of a multiprocessor system according to the fifth embodiment of the present invention, in which a parallel input/output function is added to the multiprocessor system in the third embodiment (FIG. 8). A different point from FIG. 8 is that an external device 820-1 and a communication port 830-1 are provided. The external device 820-1 is provided for memorizing and holding, or indicating data in the processor elements 720-1–720-4. The communication port 830-1 is provided for controlling, according to a selection control signal from each processor element 720-1–720-4, exchange between data transfer between the processor elements 720-1–720-4 and the host processor 710 and the data transfer between the processor elements 720-1–720-4 and the external device 820-1. Each processor element 720-1–720-4 is composed of the processor element in the third embodiment (FIG. 8) with adding a function of outputting a selection control signal for making the communication port 830-1 select a target of data transfer.

In FIG. 12, each processor element group 850-1–850-n is composed of the four processor elements 720-1–720-4. 80 indicates an internal bus. 81 indicates a control signal line. 11 indicates a data bus between the host processor 710 and each processor element group 850-1–850-n. 21 is a data transfer control signal which is a total name of the strobe signal, the data transfer inhibiting signal, the data/parameter recognition signal and the strobe echo in first and second embodiments. The inside construction of the host processor 710 is the same as that shown in FIG. 8. 820-1–820-n indicate external devices. 830-1–830-n are communication ports.

Data transfer operation of the multiprocessor system under the above construction is described. In this embodiment, as well as in the third embodiment, each processor element 720-1–720-4 individually performs the judgement for data distribution, arrangement and collection. A different point from the third embodiment is that the data may be transferred by the processor elements 720-1–720-4 not only to the host processor 710 but also to the external devices 820-1–820-4.

In FIG. 12, when the processor elements 720-1–720-4 in a certain processor element group 850-1 performs parallel data transmission to the external device 820-1, each processor element 720-1–720-4 directs the communication port 830-1 to transmit data. The respective data transmitters 600 (refer to FIGS. 5 and 8) of the processor elements 720-1–720-4 individually judge whether data can be transmitted with the process described in the second embodiment to send out the data to the internal bus 80. The communication port 830-1 outputs the data on the internal bus 80 to the external device 820-1.

When the processor elements 720-1–720-4 in a certain processor element group 850-1 performs parallel data receiving from the external device 820-1, each processor element 720-1–720-4 directs the communication port 830-1 to read out data from the external device 820-1. The communication port 830-1 puts the data read out from the external device 820-1 onto the internal bus 80. The respective data receivers 200 (refer to FIGS. 1 and 8) of the processor elements 720-1–720-4 individually judges whether the data can be received with the process described in the first embodiment to fetch the data on the internal bus 80.

As described above, according to this embodiment, the multiprocessor system is composed of the processor elements 720-1–720-4 each having the data transfer device 750 (FIG. 8) which has functions of the data receiver 200 in the first embodiment and of the data transmitter 600 in the second embodiment, and the external devices 820-1–820-n are respectively connected via the communication ports 830-1–830-n to the internal buses of the n processor element groups 850-1–850-n each having the plural processor elements. Thus, in addition to the effects in the third embodiment, parallel input/output function is achievable independently in each processor element group 850-1–850-n. For example, if an external memory devices such as magnet disks are employed as the external devices 820-1–820-n, data input/output can be executed in parallel in each processor element group 850-1–850-n. If data indicators are employed as the external devices 820-1–820-n. the processed results of the respective processor element groups 850-1–850-n can be outputted in parallel to the data indicators, thus obtaining high-speed data processing indicators. The external devices 820-1–820-n may be respectively connected to the plural processor element groups 850-1–850-n.

According to this embodiment, since each processor element 720-1–720-4 judges individually whether data can be transferred to and from the external device 820-1, the switches and control signals for selecting the processor elements are unnecessary, and independent control signal lines for each processor element are unnecessary. As a result, a parallel input/output device preventing the lowering of transfer efficiency is achievable. Hence, in this embodiment, the data transfer speed and data-process managing ability of the whole multiprocessor system are improved.

(CONCLUSION)

As discussed above, with the data transfer device and the multiprocessor system according to each embodiment, each data transfer device performs individually the judgement regarding data distribution, arrangement and collection, thus simplifying the hardware and reducing the hardware such as control lines, switches. Further, each data transfer device uses a common hardware, which leads to easy making in VLSI.

Further, the race of the broadcast buses at data collection can be avoided. Efficient data transfer (distribution, arrangement and collection) can be performed only with the initial parameter setting. The hardware of the host processor and each processor element are simplified without providing special hardware to both the data transmitter and the data receiver such as in case of packet control.

One data transmitter 100 which is to be the pair to the plural data receivers 200 sets the control parameter in the first embodiment (FIG. 1) and one data receiver 500 to be the pair to the plural data transmitters 600 sets the control parameter in the second embodiment (FIG. 5), but the control parameter may be generated inside. In the multiprocessor system in the third embodiment (FIG. 8), the processor 700 in each processor element 720-1–720-n can generate the control parameter therewithin by calculation processing.

Moreover, in the concrete example (FIGS. 10 and 11) mentioned in the fourth embodiment, the cyclic arrangement method is employed that array data are assigned multiply, cyclically to the four processor elements PE(1, 1)–PE(2, 2), but other methods such as block arrangement method, mixed method of the both are applicable. According to the block arrangement method, for example, a series of array data composing one block are multiply assigned to each processor element. This method is achievable by changing control sequence of the counters 301a–301c by the counting control unit 302 in FIG. 4A.

We claim:

1. A data transfer device, comprising:
a data receiver for selectively receiving an element of array data which is transmitted via a data bus connecting the transmitter and receiver, comprising:
a first identification number holding unit for holding an identification number assigned to the data receiver,
a first control parameter holding unit for holding a control parameter, received from the transmitter via the data bus prior to data transfer, indicating an element range of array data to be received,
a first data memory, connected to the transmitter via the data bus, for receiving transmitted data in synchronization with a strobe signal, and
a first transfer allowance judging unit having as inputs the identification number from the first identification number holding unit, the first control parameter from the first control parameter holding unit, and the strobe signal from said transmitter, the first transfer allowing judging unit updating a counting value according to the control parameter in synchronization with the strobe signal sent out from the data transmitter to the receiver, the first transfer allowing judging unit comparing the identification number and the counting value and controlling the data memory to receive data only upon conformity of the identification number with the counting value; and
a data transmitter for transmitting an element of array data to a data receiver via a data bus connecting the transmitter and receiver, comprising:
a second identification number holding unit for holding a second identification number assigned to the data transmitter,
a second control parameter holding unit for holding a second control parameter, received from the receiver via the data bus prior to data transfer, indicating an element range of array data to be transmitted,
a second data memory, connected to the receiver via the data bus, for storing data to be transmitted and transmitting said stored data in synchronization with a second strobe signal, and
a second transfer allowance judging unit having as inputs the identification number from the second identification number holding unit, the second control parameter from the second control parameter holding unit, and the strobe signal from said transmitter, the second transfer allowing judging unit updating a second counting value according to the second control parameter in synchronization with the second strobe signal sent out from the data receiver to the transmitter, the second transfer allowing judging unit comparing the second identification number and the second counting value and controlling the second data memory to transmit data only upon conformity of the second identification number with the second counting value,
wherein the control parameter functions so that data transmission occurs without a data packet being transmitted with every data transfer.

2. A multiprocessor system, comprising:
a plurality of processor elements each having a processor, a memory for storing data, and a data transfer device including at least one of:

a data receiver for selectively receiving an element of array data which is transmitted via a data bus connecting the transmitter and receiver, comprising:
  a first identification number holding unit for holding an identification number assigned to the data receiver,
  a first control parameter holding unit for holding a control parameter, received from the transmitter via the data bus prior to data transfer, indicating an element range of array data to be received,
  a first data memory, connected to the transmitter via the data bus, for receiving transmitted data in synchronization with a strobe signal, and
  a first transfer allowance judging unit having as inputs the identification number from the first identification number holding unit, the first control parameter from the first control parameter holding unit, and the strobe signal from said transmitter, the first transfer allowing judging unit updating a counting value according to the first control parameter in synchronization with the strobe signal sent out from the data transmitter to the receiver, the transfer allowing judging unit comparing the identification number and the counting value and controlling the data memory to receive data only upon conformity of the identification number with the counting value; and
a data transmitter for transmitting an element of array data to a data receiver via a data bus connecting the transmitter and receiver, comprising:
  a second identification number holding unit for holding a second identification number assigned to the data transmitter,
  a second control parameter holding unit for holding a second control parameter, received from the receiver via the data bus prior to data transfer, indicating an element range of array data to be transmitted,
  a second data memory, connected to the receiver via the data bus, for storing data to be transmitted and transmitting said stored data in synchronization with a second strobe signal, and
  a second transfer allowance judging unit having as inputs the identification number from the second identification number holding unit, the second control parameter from the second control parameter holding unit, and the strobe signal from said transmitter, the second transfer allowing judging unit updating a second counting value according to the second control parameter in synchronization with the second strobe signal sent out from the data receiver to the transmitter, the second transfer allowing judging unit comparing the second identification number and the second counting value and controlling the second data memory to transmit data only upon conformity of the second identification number with the second counting value; and
another processor connected to each of the plural processor elements to perform cross-communication,
  wherein said identification number allows data transmission without a data pocket being transmitted with every data transfer.

3. A multiprocessor system, comprising:
a plurality of processor elements each of which includes a processor, a memory for storing data and a data transfer device comprising:
  a data receiver for selectively receiving an element of array data which is transmitted via a data bus connecting the transmitter and receiver, comprising:
    a first identification number holding unit for holding an identification number assigned to the data receiver,
    a first control parameter holding unit for holding a control parameter, received from the transmitter via the data bus prior to data transfer, indicating an element range of array data to be received,
    a first data memory, connected to the transmitter via the data bus, for receiving transmitted data in synchronization with a strobe signal, and
    a first transfer allowance judging unit having as inputs the identification number from the first identification number holding unit, the first control parameter from the first control parameter holding unit, and the strobe signal from said transmitter, the first transfer allowing judging unit updating a counting value according to the control parameter in synchronization with the strobe signal sent out from the data transmitter to the receiver, the first transfer allowing judging unit comparing the identification number and the counting value and controlling the data memory to receive data only upon conformity of the identification number with the counting value; and
  a data transmitter for transmitting an element of array data to a data receiver via a data bus connecting the transmitter and receiver, comprising:
    a second identification number holding unit for holding a second identification number assigned to the data transmitter,
    a second control parameter holding unit for holding a second control parameter, received from the receiver via the data bus prior to data transfer, indicating an element range of array data to be transmitted,
    a second data memory, connected to the receiver via the data bus, for storing data to be transmitted and transmitting said stored data in synchronization with a second strobe signal, and
    a second transfer allowance judging unit having as inputs the identification number from the second identification number holding unit, the second control parameter from the second control parameter holding unit, and the strobe signal from said transmitter, the second transfer allowing judging unit updating a second counting value according to the second control parameter in synchronization with the second strobe signal sent out from the data receiver to the transmitter, the second transfer allowing judging unit comparing the second identification number and the second counting value and controlling the second data memory to transmit data only upon conformity of the second identification number with the second counting value;
a plurality of external devices for executing input and output of data; and
a plurality of communication ports equal in number to the external devices for controlling bus connection between the plurality of external devices and a plurality of processor element groups equal in number to the external devices into which the plurality of processor elements are divided.

\* \* \* \* \*